US008842604B2

(12) United States Patent
Luo et al.

(10) Patent No.: US 8,842,604 B2
(45) Date of Patent: Sep. 23, 2014

(54) WIRELESS COMMUNICATION SYSTEMS WITH FEMTO NODES

(75) Inventors: Tao Luo, San Diego, CA (US); Juan Montojo, San Diego, CA (US); Xiaoxia Zhang, San Diego, CA (US)

(73) Assignee: QUALCOMM Incorporated, San Diego, AZ (US)

( * ) Notice: Subject to any disclaimer, the term of this patent is extended or adjusted under 35 U.S.C. 154(b) by 407 days.

(21) Appl. No.: 12/559,385

(22) Filed: Sep. 14, 2009

(65) Prior Publication Data

US 2010/0067443 A1 Mar. 18, 2010

Related U.S. Application Data

(60) Provisional application No. 61/097,154, filed on Sep. 15, 2008, provisional application No. 61/098,371, filed on Sep. 19, 2008.

(51) Int. Cl.
 *H04W 4/00* (2009.01)
(52) U.S. Cl.
 USPC .......................................................... 370/328
(58) Field of Classification Search
 USPC ........................................ 370/331, 328, 338
 See application file for complete search history.

(56) References Cited

U.S. PATENT DOCUMENTS

| 7,270,273 | B2 | 9/2007 | Barber et al. | |
|---|---|---|---|---|
| 7,778,151 | B2 * | 8/2010 | Bertrand et al. | 370/208 |
| 7,782,967 | B2 | 8/2010 | Cheng et al. | |
| 8,014,424 | B2 | 9/2011 | Luo | |
| 8,116,195 | B2 * | 2/2012 | Hou et al. | 370/210 |
| 8,379,542 | B2 | 2/2013 | Wang et al. | |
| 2004/0235472 | A1 | 11/2004 | Fujishima et al. | |
| 2005/0216821 | A1 | 9/2005 | Harada | |
| 2007/0153876 | A1 | 7/2007 | Pi et al. | |
| 2007/0270273 | A1 | 11/2007 | Fukuta et al. | |
| 2008/0019306 | A1 | 1/2008 | Damnjanovic | |
| 2008/0170602 | A1 * | 7/2008 | Guey | 375/137 |
| 2008/0175219 | A1 | 7/2008 | Jen | |
| 2008/0299984 | A1 | 12/2008 | Shimomura et al. | |
| 2009/0046573 | A1 | 2/2009 | Damnjanovic | |
| 2009/0109919 | A1 * | 4/2009 | Bertrand et al. | 370/330 |
| 2009/0135804 | A1 | 5/2009 | Swarts et al. | |
| 2010/0027486 | A1 | 2/2010 | Gorokhov et al. | |

(Continued)

FOREIGN PATENT DOCUMENTS

| WO | WO2007097597 | | 8/2007 |
|---|---|---|---|
| WO | WO2008020609 | A1 | 2/2008 |

OTHER PUBLICATIONS

International Search Report—PCT/US2009/057028—International Search Authority, European Patent Office, Dec. 16, 2009.

(Continued)

*Primary Examiner* — Mark Rinehart
(74) *Attorney, Agent, or Firm* — Ashish L. Patel

(57) ABSTRACT

Systems and methods for performing a handoff of an access terminal from a macro node to a femto node are disclosed. In one embodiment, the femto node is configured to transmit a predetermined signal for determining signal quality and an identifier that uniquely identifies the femto node to the access terminal. The access terminal is configured to transmit the identifier to the macro node. The femto node is identified as a hand in target based on the transmitted identifier and the macro node is configured to hand in the access terminal to the femto node.

59 Claims, 14 Drawing Sheets

(56) References Cited

U.S. PATENT DOCUMENTS

| | | |
|---|---|---|
| 2010/0039998 A1 | 2/2010 | Imamura et al. |
| 2010/0067514 A1 | 3/2010 | Luo et al. |
| 2010/0232284 A1 | 9/2010 | Imamura et al. |
| 2010/0284350 A1 | 11/2010 | Korhonen et al. |
| 2011/0019637 A1 | 1/2011 | Ojala et al. |
| 2011/0105121 A1 | 5/2011 | Kazmi et al. |
| 2011/0189950 A1 | 8/2011 | Noh et al. |
| 2011/0261803 A1 | 10/2011 | Moorti et al. |

OTHER PUBLICATIONS

International Search Report—PCT/US2009/057032—International Search Authority, European Patent Office, Dec. 14, 2009.

Dahlman, et al., "3G evolution : HSPA and LTE for Mobile Broadband" Jan. 1, 2007, No. 1, p. 485, XP040425740, sections 16.3.2.1, 17.1-17.2, figures 17.1-17.3.

Panasonic, NTT DoCoMo: "Zadoff-Chu sequence allocation on RACH for complexity reduction", TSG-RAN WG1 Meeting No. 47bis R1-070189 Sorrento, Italy, Jan. 15 to 19, 2007.

Zakharov, Y.V., et al., "Detection of preamble of random access burst in W-CDMA system", Personal, Indoor and Mobile Radio Communications, 2000, PIMRC 2000, The 11th IEEE International Symposium on Date of Conference: 2000, pp. 82-86.

Written Opinion—PCT/US2009/057032—ISA/EPO—Dec. 14, 2009.

\* cited by examiner

| Sequence | Bit Pattern | |
|---|---|---|
| ZC0 | 00000 | Group 1 |
| ZC1 | 00001 | |
| ZC2 | 00010 | |
| ZC3 | 00011 | |
| ZC4 | 00100 | Group 2 |
| ZC5 | 00101 | |
| ZC6 | 00110 | |
| ZC7 | 00111 | |
| ZC8 | 01000 | Group 3 |
| ZC9 | 01001 | |
| ZC10 | 01010 | |
| ZC11 | 01011 | |
| ZC12 | 01100 | Group 4 |
| ZC13 | 01101 | |
| ZC14 | 01110 | |
| ZC15 | 01111 | |
| ZC16 | 10000 | Group 5 |
| ZC17 | 10001 | |
| CZ18 | 10010 | |
| CZ19 | 10011 | |
| ZC20 | 10100 | Group 6 |
| ZC21 | 10101 | |
| ZC22 | 10110 | |
| ZC23 | 10111 | |
| ZC24 | 11000 | Group 7 |
| ZC25 | 11001 | |
| ZC26 | 11010 | |
| ZC27 | 11011 | |
| ZC28 | 11100 | Group 8 |
| ZC29 | 11101 | |
| ZC30 | 11110 | |
| ZC31 | 11111 | |

FIG. 7

| Sequence | Femto Cell ID |
|---|---|
| ZC0 | 0 |
| ZC1 | 0 |
| ZC2 | 0 |
| ZC3 | 0 |
| ZC4 | 1 |
| ZC5 | 1 |
| ZC6 | 1 |
| ZC7 | 1 |
| ZC8 | 2 |
| ZC9 | 2 |
| ZC10 | 2 |
| ZC11 | 2 |
| ZC12 | 3 |
| ZC13 | 3 |
| ZC14 | 3 |
| ZC15 | 3 |
| ZC16 | 4 |
| ZC17 | 4 |
| CZ18 | 4 |
| CZ19 | 4 |
| ZC20 | 5 |
| ZC21 | 5 |
| ZC22 | 5 |
| ZC23 | 5 |
| ZC24 | 6 |
| ZC25 | 6 |
| ZC26 | 6 |
| ZC27 | 6 |
| ZC28 | 7 |
| ZC29 | 7 |
| ZC30 | 7 |
| ZC31 | 7 |

FIG. 8

WIRELESS COMMUNICATION SYSTEMS WITH FEMTO NODES

CLAIM OF PRIORITY UNDER 35 U.S.C. §119

The present application for patent claims priority to U.S. Provisional Application No. 61/097,154, entitled "METHODS AND SYSTEMS FOR EFFICIENT PHYSICAL RANDOM ACCESS CHANNEL (PRACH) SIGNAL DESIGN FOR SMALL SIZE CELLS," filed Sep. 15, 2008. The present application for patent also claims priority to U.S. Provisional Application No. 61/098,371, entitled "METHODS AND SYSTEMS FOR EFFICIENT PHYSICAL RANDOM ACCESS CHANNEL (PRACH) SIGNAL DESIGN FOR SMALL SIZE CELLS," filed Sep. 19, 2008. The above-referenced applications are hereby expressly incorporated by reference herein.

REFERENCE TO CO-PENDING APPLICATIONS FOR PATENT

The present application for patent is related to the following co-pending U.S. patent application: U.S. patent application Ser. No. 12/559,381, entitled "WIRELESS COMMUNICATION SYSTEMS WITH FEMTO NODES", filed on even date herewith, having, assigned to the assignee hereof, and expressly incorporated by reference herein.

BACKGROUND

1. Field

The present application relates generally to wireless communication, and more specifically to systems and methods for using a random access channel (RACH).

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. Multiple femto nodes may be deployed by individual users in the coverage area of a traditional macro node. Femto nodes may support (e.g., simultaneously communicate with) fewer wireless devices when compared to larger base stations such as cell towers or Node Bs. Better utilization of the RACH channels used by femto nodes may be desirable.

SUMMARY

In one embodiment, a wireless communication apparatus operable in a communication system is provided. The apparatus comprises a receiver configured to receive an identification of a base station and a selection circuit. The selection circuit is configured to obtain a subset of a plurality of sequences based on, at least in part, the identification of the base station. The selection circuit is further configured to select a first sequence from the subset of the plurality of sequences and a transmitter configured to transmit a preamble, using the first sequence.

In another embodiment, a wireless communication apparatus operable in a communication system is provided. The apparatus comprises means for receiving an identification of a base station and means for obtaining a subset of a plurality of sequences based on, at least in part, the identification of the base station. The apparatus further comprises means for selecting a first sequence from the subset of the plurality of sequences and means for transmitting a preamble, using the first sequence.

In yet another embodiment, a method of communicating in a communication system is provided. The method comprises receiving an identification of a base station and obtaining a subset of a plurality of sequences based on, at least in part, the identification of the base station. The method further comprises selecting a first sequence from the subset of the plurality of sequences and transmitting a preamble, using the first sequence.

In a further embodiment, a computer program product, comprising computer-readable medium is provided. The medium comprises code for causing a computer to receive an identification of a base station and code for causing a computer to obtain a subset of a plurality of sequences based on, at least in part, the identification of the base station. The medium further comprises code for causing a computer to select a first sequence from the subset of the plurality of sequences and code for causing a computer to transmit a preamble, using the first sequence.

In one embodiment, a wireless communication apparatus operable in a communication system is provided. The apparatus comprises a memory configured to store a subset of a plurality of sequences each sequence being associated with one of a plurality of bit patterns. The apparatus also comprises a receiver configured to receive a preamble from an access terminal, the preamble comprising a preamble sequence and a decoding circuit in communication with the memory. The decoding circuit is configured to obtain the preamble sequence and match the preamble sequence with a matching sequence in the subset of the plurality of sequences.

In another embodiment, a wireless communication apparatus operable in a communication system is provided. The apparatus comprises means for storing a subset of a plurality of sequences each sequence being associated with one of a plurality of bit patterns and means for receiving a preamble from an access terminal, the preamble comprising a preamble sequence. The apparatus also comprises means for obtaining the preamble sequence and means for matching the preamble sequence with a matching sequence in the subset of the plurality of sequences.

In yet another embodiment, a method of communicating in a communication system is provided. The method comprises storing a subset of a plurality of sequences each sequence being associated with one of a plurality of bit patterns and receiving a preamble from an access terminal, the preamble comprising a preamble sequence. The method also comprises obtaining the preamble sequence and matching the preamble sequence with a matching sequence in the subset of the plurality of sequences.

In a further embodiment, a computer program product, comprising computer-readable medium is provided. The medium comprises code for causing a computer to store a subset of a plurality of sequences each sequence being associated with one of a plurality of bit patterns and code for causing a computer to receive a preamble from an access terminal, the preamble comprising a preamble sequence. The medium also comprises code for causing a computer obtain the preamble sequence and code for causing a computer match the preamble sequence with a matching sequence in the subset of the plurality of sequences.

BRIEF DESCRIPTION OF THE DRAWINGS

FIG. 7 is a table illustrating a first exemplary association of sequences and bit patterns which may be used by the femto nodes and access terminals shown in FIGS. 4, 5, and/or 6.

FIG. 8 is a table illustrating a second exemplary association of sequences and bit patterns which may be used by the femto nodes and access terminals shown in FIGS. 4, 5, and/or 6.

DETAILED DESCRIPTION

Figure 1:
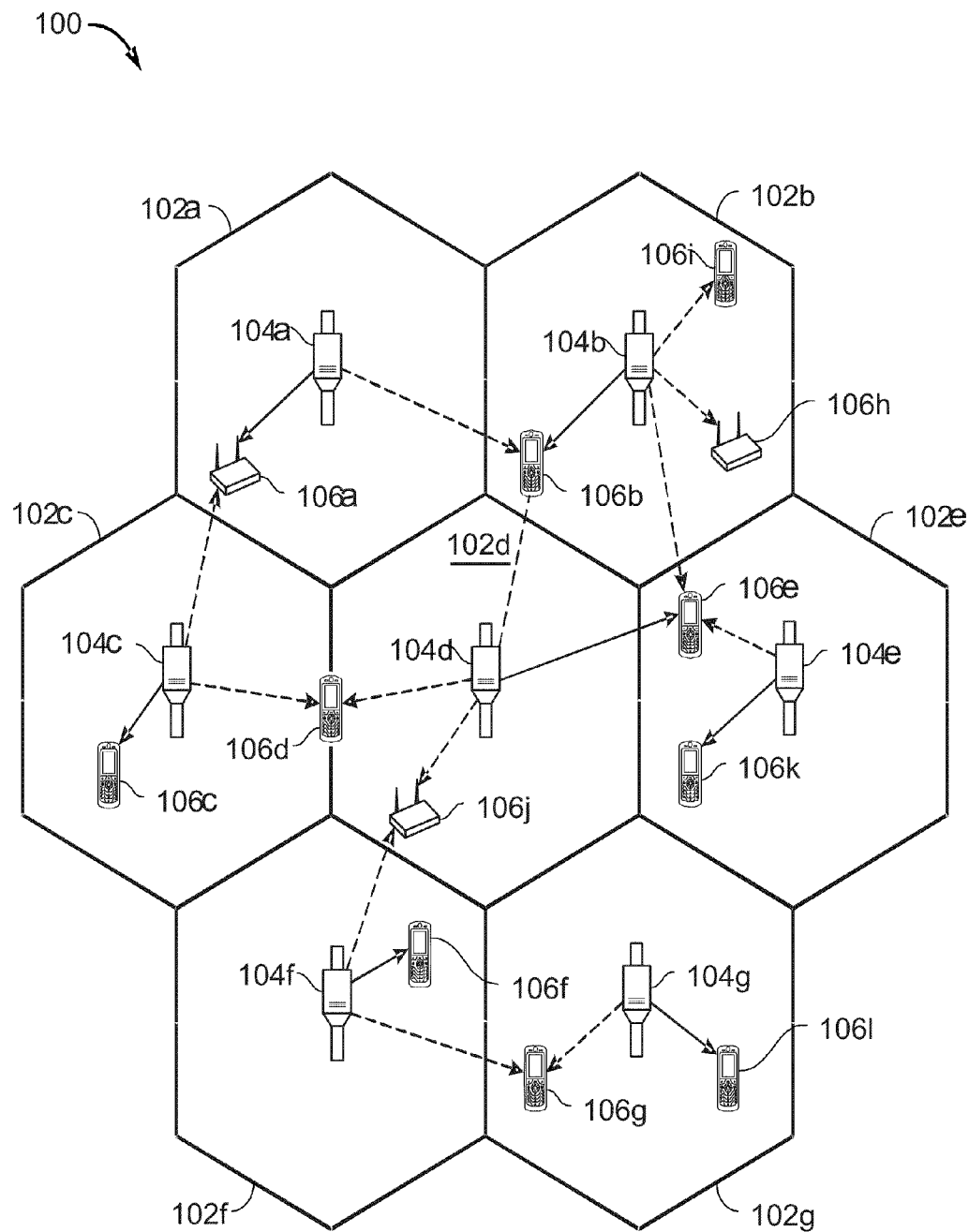
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node.

The nodes 104 may be interconnected, for example, by appropriate wired or wireless interfaces and may be able to communicate with each other. Accordingly, each AT 106 may communicate with another AT 106 through one or more nodes 104. For example, the AT 106*j* may communicate with the AT 106*h* as follows. The AT 106*j* may communicate with the node 104*d*. The node 104*d* may then communicate with the node 104*b*. The node 104*b* may then communicate with the AT 106*h*. Accordingly, a communication is established between the AT 106*j* and the AT 106*h*.

The wireless communication network 100 may provide service over a large geographic region. For example, the cells 102*a*-102*g* may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b*-106*g*, 106*i*, 106*k*, and 106*l* comprise mobile phones. However, each of ATs 106*a*-106*l* may comprise any suitable communication device.

Figure 2:
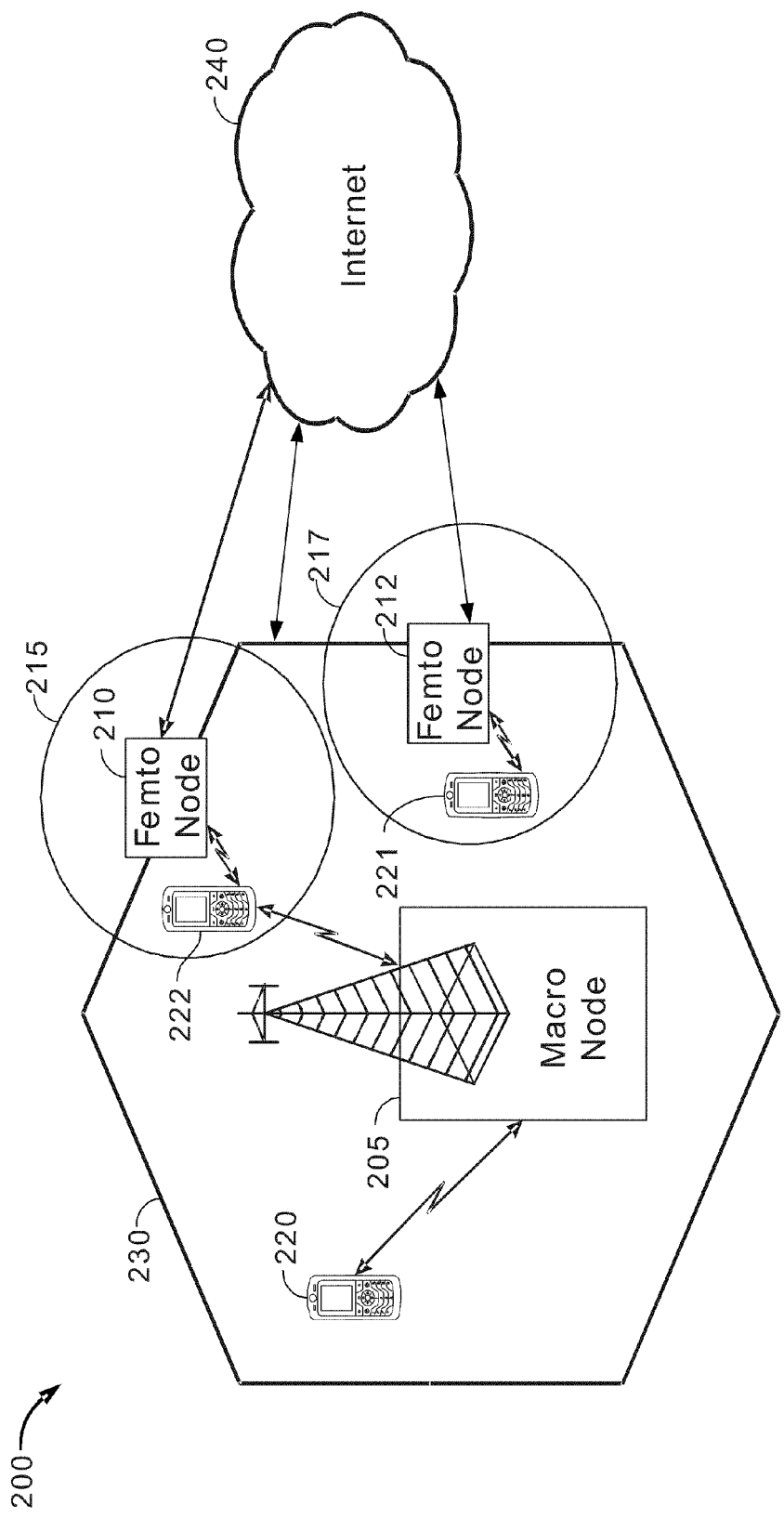
FIG. 2 illustrates exemplary interoperations of two or more communication networks.

FIG. 2 illustrates exemplary interoperations of two or more communication networks. It may desirable for an AT 220 to transmit information to and receive information from another AT such as AT 221. FIG. 2 illustrates a manner in which the ATs 220, 221, and 222 may communicate with each other. As shown in FIG. 2, the macro node 205 may provide communication coverage to access terminals within a macro area 230. For example, the AT 220 may generate and transmit a message to the macro node 205. The message may comprise information related to various types of communication (e.g., voice, data, multimedia services, etc.). The AT 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The AT 222 may communicate with the femto node 210 via a wireless link and the AT 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the AT 220 to a switching center (not shown in FIG. 2), which may forward the message to another network. The network 240 may also be used to facilitate communication between the ATs 220, 221, and 222. For example, the AT 220 may be in communication with the AT 221. The AT 220 may transmit a message to the macro node 205. The macro node may forward the message to the network 240. The network 240 may forward the messages to the femto node 212. The femto node 212 may forward the message to the AT 221. Similarly, the reverse path may be followed from the AT 221 to the AT 220. In another example, the AT 221 may be in communication with the AT 222. The AT 221 may transmit a message to the femto node 212. The femto node 212 may forward the message to the network 240. The network 240 may forward the message to the femto node 210. The femto node 210 may forward the message to the AT 222. Similarly, the reverse path may be followed from the AT 222 to the AT 221.

In one embodiment, the femto nodes 210, 212 may be deployed by individual consumers and placed in homes, apartment buildings, office buildings, and the like. The femto nodes 210, 212 may communicate with the ATs in a predetermined range (e.g., 100 m) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

As discussed above, the AT 222 may be in communication with the femto node 210 via a wireless link. In one embodiment, the AT 222 may establish the wireless link between the AT 222 and the femto node 210 by transmitting a preamble to the femto node 210. The preamble transmitted by the AT 222 to the femto node 210 may indicate to the femto node 210 that AT 222 is initiating the establishment of the wireless link. When the femto node 210 receives the preamble from the AT 222, the femto node 210 and the AT 222 may exchange messages and data needed to establish the wireless link. The AT 222 may transmit the preamble to the femto node 210 over a Random Access Channel (RACH). The RACH is an uplink communication channel (e.g., going from the AT 222 to the femto node 210). In one embodiment, each node, such as a femto node, a pico node, and a Node B, may have its own RACH. The AT 222 may use the RACH for a variety of purposes including, but not limited to, accessing a wireless network (e.g., establishing a voice call), requesting resources (e.g., requesting a dedicated communication channel from the femto node 210), sending control information (e.g., control messages), and transmitting small amounts of data to the femto node 210.

In one embodiment, the RACH is a common channel which may be used simultaneously by various ATs, such as AT 220, 221, and 222. For example, although not shown in FIG. 2, the ATs 220, 221, and 222 may all initiate communication with the femto node 210 at around the same time. In order to establish wireless links, the ATs 220, 221, and 222 may all transmit preambles to the femto node 210 over the RACH of femto node 210 at around the same time. This may result in collisions of the preambles from the ATs 220, 221, and 222. In another embodiment, a preamble may be formatted to help mitigate the problem of colliding preambles sent from multiple ATs, such as the ATs 220, 221, and 222. In one embodiment, a preamble may comprise a cyclic prefix, and a sequence.

The cyclic prefix may be used to help mitigate multipath problems in wireless links. For example, the AT 222 may establish a wireless link with the femto node 210 using a wireless signal. Due to objects and obstructions that may be in between the AT 222 and the femto node 210, the wireless signal transmitted from the AT 222 to the femto node 210 may be bounced around the objects and obstructions before the wireless signal reaches the femto node 210. Thus, a message transmitted from the AT 222 wireless signal may reach the femto node 210 via multiple paths (e.g., multipath). The same message may arrive multiple times at the femto node 210, due to the different paths. In addition, the same message may also arrive at different times, along the different paths. These problems may be referred to as inter-symbol interference (ISI). A cyclic prefix may be prepended at the front of the preamble to help mitigate ISI.

The sequence may be used to help mitigate the problem of colliding preambles. Each of the ATs 220, 221, and 222 may use a different sequence in the preamble. In one embodiment, the sequence used in the preamble may comprise a Zadoff-Chu sequence. A Zadoff-Chu generally refers to a mathematical sequence which may be cyclically shifted (e.g., moving a term from the beginning of the sequence to the end of the sequence and/or moving a term from the end of the sequence to the beginning of the sequence). Shifted Zadoff-Chu sequences may be derived (e.g., obtained by cyclically shifting) from a root Zadoff-Chu sequence. For example, a root Zadoff-Chu sequence {a0, a1, a2} may comprise three terms a0, a1, and a2. A shifted Zadoff-Chu sequence may comprise the same three terms, a0, a1, and a2 rearranged as follows: {a1, a2, a0}. Another shifted Zadoff-Chu sequence may comprise the same three terms, a0, a1, and a2 rearranged as follows: {a2, a0, a1}. In one embodiment, a Zadoff-Chu sequence may be cyclically shifted multiple times to provide a total of 64 Zadoff-Chu sequences. Thus, the femto nodes 210 and 212 may support up to 64 wireless communication devices (such as ATs 220, 221, and 222), where each wireless communication device uses one of the 64 Zadoff-Chu sequences when the each device transmits a preamble. In another embodiment, a different number of Zadoff-Chu sequences may be obtained by cyclic shifting. The number of shifted Zadoff-Chu sequence which may be obtained from a root Zadoff-Chu sequence may depend on the length of the Zadoff-Chu sequence and/or the size of the femto nodes/macro cells (e.g., the number of wireless communication devices supported and/or a geographic size). In one embodiment, if a desired number of sequences cannot be generated from a first root Zadoff-Chu sequence, additional sequences generated from other Zadoff-Chu sequences may be used.

All of the shifted Zadoff-Chu sequences and the root Zadoff-Chu sequence may be orthogonal to each other. For example, the AT 220 may use a first shifted Zadoff-Chu sequence SZC1 to transmit a first wireless signal and the AT 221 may use a second shifted Zadoff-Chu sequence SZC2 to transmit a second wireless signal. The first wireless signal and the second wireless signal will not interfere with each other (e.g., they are orthogonal) even though they are being transmitted on the same frequency. For example, the AT 220 may use a shifted Zadoff-Chu sequence SZC1 in its preamble and the AT 222 may use a shifted Zadoff-Chu sequence SZC2 in its preamble, and the preambles transmitted by the AT 220 and the AT 222 will not interfere (e.g., collide) with each other when they are transmitted over the RACH at the same time. In another example, the AT 220 may use a root Zadoff-Chu sequence RZC in its preamble and the AT 222 may use a shifted Zadoff-Chu sequence SZC3 in its preamble, and the preambles transmitted by the AT 220 and the AT 222 will not interfere (e.g., collide) with each other when they are transmitted over the RACH at the same time.

In one embodiment, the Zadoff-Chu sequences used by the ATs 220, 221, and 222 may be 839 units (e.g., a time unit and/or a symbol such a sequence of at least one bit) in length. In another embodiment, the Zadoff-Chu sequences used by the ATs 220, 221, and 222 may be different lengths. For example, the Zadoff-Chu sequences used by the ATs 220, 221, and 222 may be 139 symbols in length. In one embodiment, the preambles used by the ATs 220, 221, and 222 may have one of five formats, format 0 through format 4. Each of the formats 0 through 4 may provide for different lengths for the cyclic prefix and the sequence of the preamble. In one embodiment, different nodes such as the femto node 210 and the macro node may use different formats for preambles in order to address propagation delay (e.g., the amount of time used to transmit data from one point to another). In one embodiment, the format 0 may provide that the cyclic prefix have a length of 3168 time units and that the sequence have a length of 24576 time units. In another embodiment, the format 1 may provide that the cyclic prefix have a length of 21024 time units and that the sequence have a length of 24576 time units. In yet another embodiment, the format 2 may provide that the cyclic prefix have a length of 6240 time units and that the sequence have a length of 2*24576 time units. In a further embodiment, the format 3 may provide that the cyclic prefix have a length of 21024 time units and that the sequence have a length of 2*24576 time units. In a certain embodiment, the sequence of a preamble using the formats 0 through 3 may use a Zadoff-Chu sequence which is 839 symbols long. In another embodiment, the formats 0 through 3 may be used in preambles for CDMA, FDMA, and TDMA communication systems. In one embodiment, the format 4 may provide that the cyclic prefix have a length of 448 time units and that the sequence have a length of 4096 time units. In another embodiment, the sequence of a preamble using the format 4 may use a Zadoff-Chu sequence which is 139 symbols long. In yet another embodiment, the format 4 may be used for preambles in TDMA communication systems. In a further embodiment, the format 4 may be used for preambles in CDMA, and FDMA communication systems.

In one embodiment, the format 4 may be used by the AT 222 when transmitting a preamble to the femto node 210. The format 4 may be shorter than the formats 1 through 3, as discussed above. Using a short preamble allows for more ATs such as AT 222 to use the RACH channel and may provide for more efficient usage of the RACH channel. For example, the RACH channel may have capacity for 64 preambles, each preamble with a length of 100 time units. However, if short preamble lengths are used, e.g., 50 time units, the RACH channel may have capacity for 128 preambles.

In one embodiment, a modified format 4 may be used by the AT 222 when transmitting a preamble to the femto node 210. The modified format 4 may comprise the same sequence length as in the original format 4, but the time span (e.g., time used to transmit the preamble) is increased. In another embodiment, the number of sub-carriers (e.g., communication channels or frequencies used to communicate data) is reduced. For example, the number of sub-carriers may be reduced from 72 sub-carriers to 12 sub-carriers. Using a shorter preamble may allow more ATs such as AT 222 to use the RACH channel and may provide for more efficient usage of the RACH channel. For example, the RACH channel may have capacity for 64 preambles, with each preamble using 72 sub-carriers. However, if short preamble lengths are used, e.g., 12 sub-carriers, the RACH channel may have up to 6 times more capacity. In one embodiment, the modified format 4 may span an entire sub-frame (e.g., unit of data), which may be compatible with the frame structure used in FDMA systems.

While the foregoing examples and embodiments have been described in connection with Zadoff-Chu sequences and the preamble formats 0 through 4, such examples are used for the purpose of explanation and should not be interpreted as limiting. The present systems and methods are equally applicable to other communication standards such as Universal Mobile Telecommunication System (UMTS) and Long Term Evolution (LTE) which may use other types of sequences of preamble formats. For example, in a UMTS system, a preamble may use an orthogonal variable spreading factor (OVSF) code instead of a Zadoff-Chu sequence. In another example, any sequence and/or code that has orthogonal properties, may be used instead of a Zadoff-Chu sequence. In yet another example, any sequence, code, and/or mathematical function that reduces interference when the sequence, code, and/or mathematical functions are used concurrently, may be used instead of a Zadoff-Chu sequence. In one example, a preamble in a UMTS system may have different formats which may provide for different lengths (in terms of time units) for the cyclic prefix and the sequence.

Figure 3:
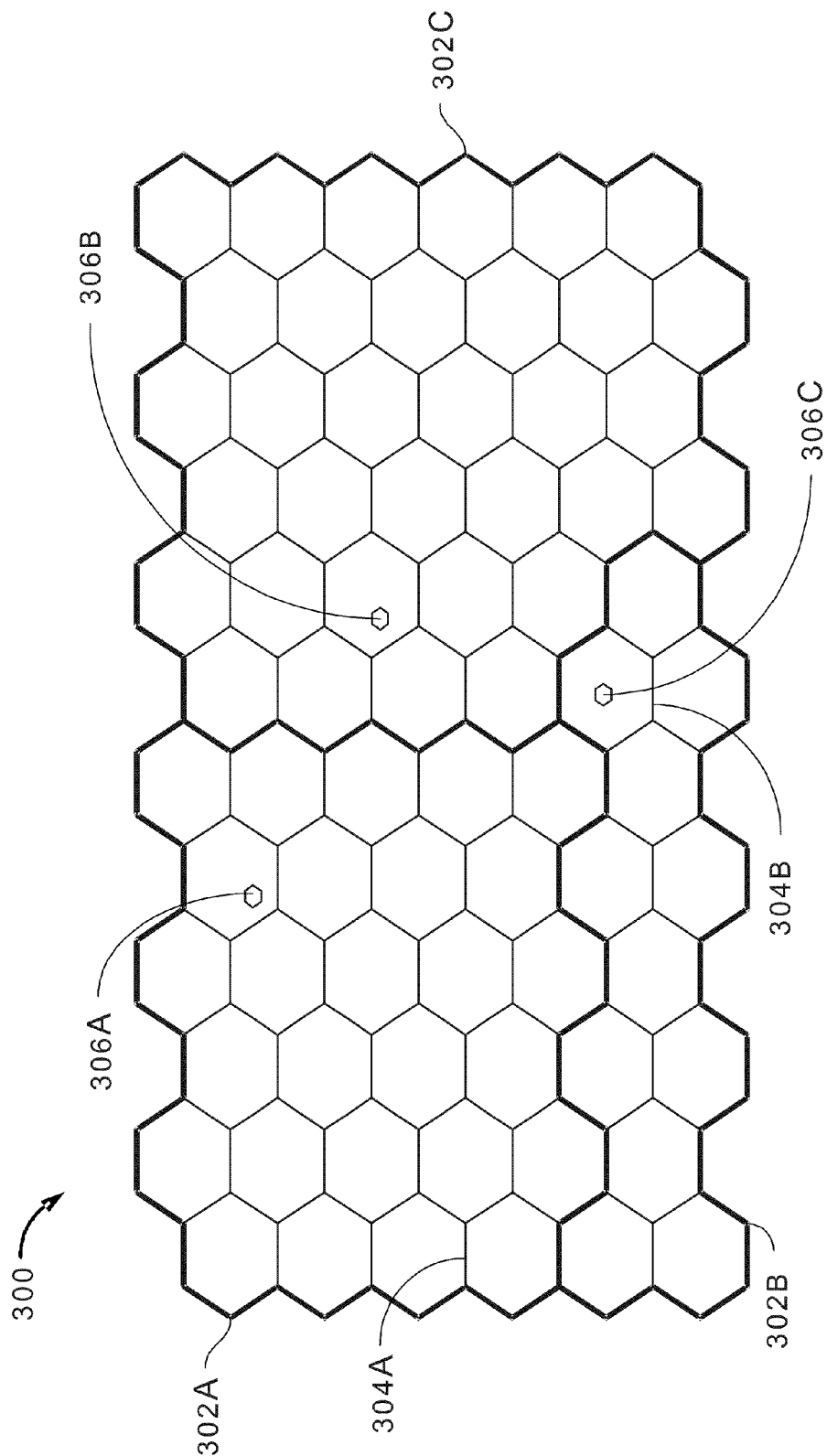
FIG. 3 illustrates exemplary coverage areas of the wireless communication networks shown in FIGS. 1 and 2.

FIG. 3 illustrates exemplary coverage areas of the wireless communication networks 100 and 200 shown in FIGS. 1 and 2. The coverage area 300 may comprise one or more geographical areas in which the AT 220 may access the communication network 240 as discussed above with respect to FIG. 2. As shown the coverage area 300 comprises several tracking areas 302 (or routing areas or location areas). Each tracking area 302 comprises several macro areas 304, which may be similar to the macro area 230 described above with respect to FIG. 2. Here, areas of coverage associated with tracking areas 302A, 302B, and 302C are shown as delineated by wide lines as and the macro areas 304 are represented by hexagons. The tracking areas 302 may also comprise femto areas 306, which may be similar to the femto area 230 described above with respect to FIG. 2. In this example, each of the femto areas 306 (e.g., femto area 306C) is depicted within a macro area 304 (e.g., macro area 304B). It should be appreciated, however, that a femto area 306 may not lie entirely within a macro area 304. In practice, a large number of femto areas 306 may be defined with a given tracking area 302 or macro area 304. Also, one or more pico areas (not shown) may be defined within a given tracking area 302 or macro area 304.

Referring again to FIG. 2, the owner of the femto node 210 may subscribe to a mobile service, such as, for example, 3G mobile service, offered through the communication network 240 (e.g., a mobile operator core network). In addition, an access terminal 222 may be capable of operating both in macro environments (e.g., macro areas) and in smaller scale (e.g., residential, femto areas, pico areas, etc.) network environments. In other words, depending on the current location of the access terminal 222, the access terminal 222 may access the communication network 240 by a macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing access terminals 222.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205).

In one embodiment, an access terminal 222 may be configured to connect to a particular (e.g., preferred) femto node (e.g., a home femto node of the access terminal 222) whenever the access terminal 222 is within communication range of the femto node. For example, the access terminal 222 may communicate with only the femto node 210 when the access terminal 222 is within the femto area 215.

In another embodiment, the access terminal 221 is communicating with a node but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 222 may limit the BSR to scanning over one or more specific bands and/or channels. Upon discovery of a preferred femto node 210, the access terminal 222 selects the femto node 210 for communicating with to access the communication network 240 within the femto area 215.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 4:
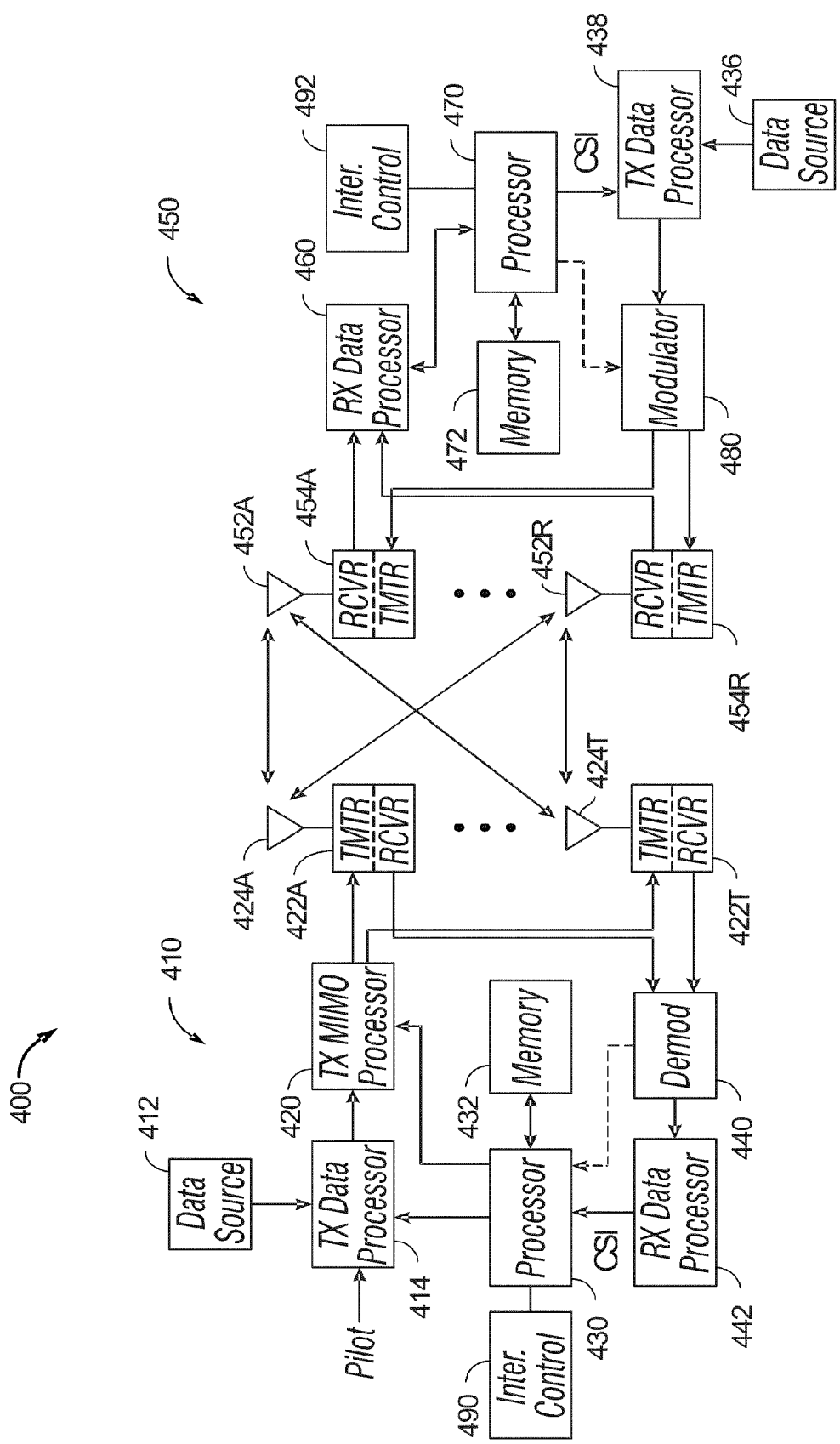
FIG. 4 is a functional block diagram of a first exemplary femto node and a first exemplary access terminal in one of the communication networks of FIG. 2.

FIG. 4 is a functional block diagram of a first exemplary femto node 410 and a first exemplary access terminal 450 in one of the communication networks of FIG. 2. As shown, a MIMO system 400 comprises a femto node 410 and an access terminal 450 (e.g., the AT 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beam-forming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each antenna 452 is provided to a respective transceiver ("XCVR") 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454 based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424. Further, the transceivers 422 condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
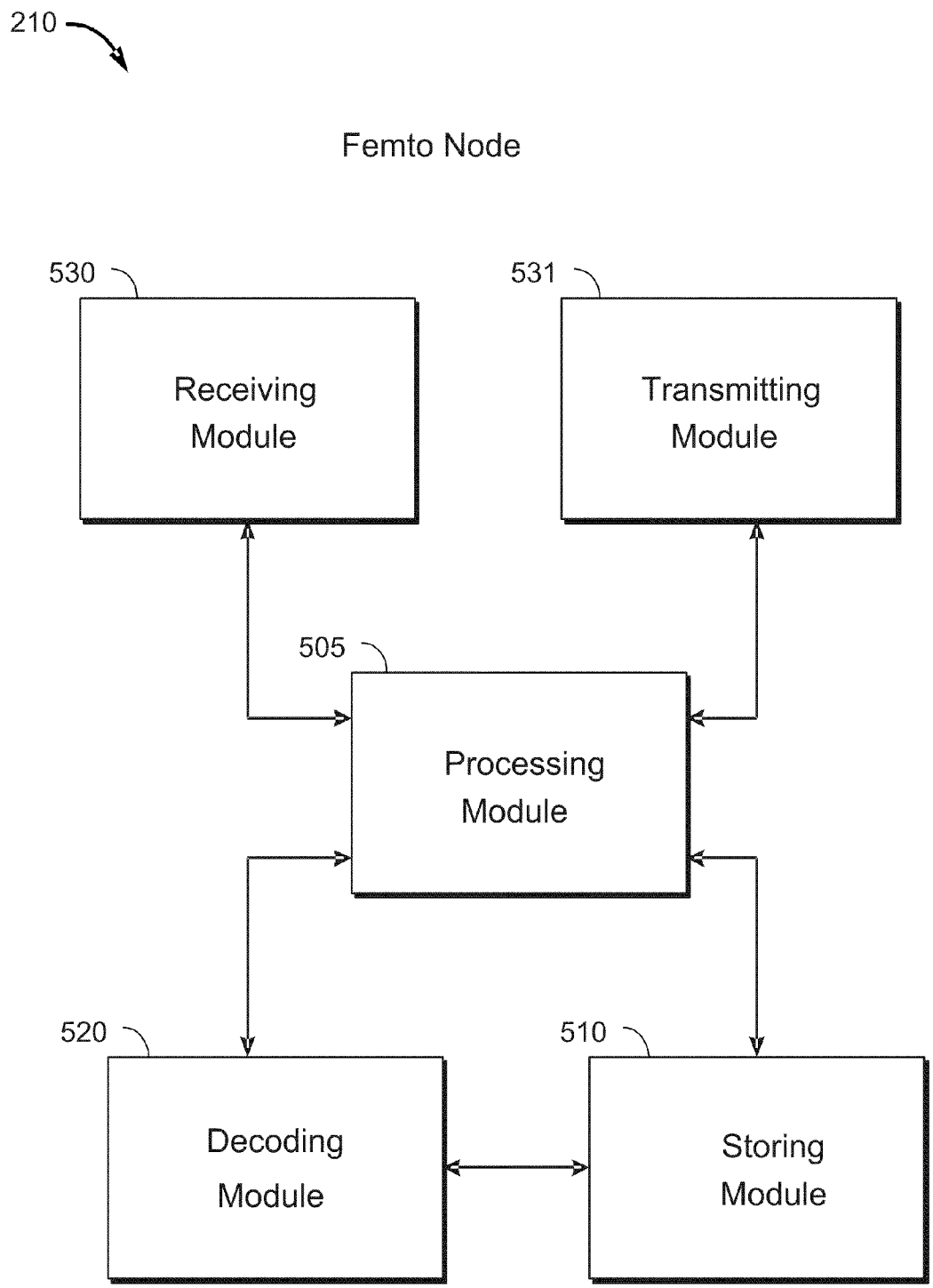
FIG. 5 is a functional block diagram of a second exemplary femto node in one of the communication networks of FIG. 2.

FIG. 5 is a functional block diagram of a second exemplary femto node 210 in one of the communication networks of FIG. 2. As discussed above with respect to FIG. 2, the femto node 210 may receive a preamble from the AT 222 when the AT 222 initiates a communication session with the femto node 210. The femto node 210 may comprise a receiving module 530 configured to receive the preamble transmitted by the AT 222. The receiving module 530 may also receive an inbound message from the AT 222. The femto node 210 may also comprise a transmitting module 531. The transmitting module 531 may send an outbound message to the AT 222. The transmitting module 531 may also send outbound messages to other devices. The receiving module 530 and the transmitting module 531 may be coupled to the processing module 505. The receiving module 530 and the transmitting module 531 may also be configured to pass an outbound message to, and receive an inbound wired message from, the network 240. The receiving module 530 may pass the inbound wired message to the processing module 505 for processing. The processing module 505 may process and pass the wired outbound message to the transmitting module 531 for transmission to the network 240. The processing module 505 may be configured to process the preamble and the inbound and outbound wireless messages coming from or going to the AT 222 via the receiving module 530 and the transmitting module 531. For further information, see the written description for FIGS. 10 and 12. The processing module 505 may also be configured to control other components of the femto node 210.

The processing module 505 may further be coupled, via one or more buses, to a storing module 510. The processing module 505 may read information from or write information to the storing module 510. For example, the storing module 510 may be configured to store inbound our outbound messages before, during, or after processing. In particular, the storing module 510 may be configured to store the different Zadoff-Chu sequences and other information associated with the Zadoff-Chu sequences (e.g., a bit pattern associated with each Zadoff-Chu sequence). The processing module 505 may also be coupled to a decoding module 520. The decoding module 520 may also process a preamble received from an AT (such as AT 220). For further information, see the written description for FIGS. 10 and 12. For example, the decoding module 520 may process a preamble, and obtain a bit pattern associate with a Zadoff-Chu sequence used in the preamble.

The receiving module 530 and the transmitting module 531 may comprise an antenna and a transceiver. The transceiver may be configured to modulate/demodulate the wireless outbound/inbound messages going to or coming from AT 222 respectively. The wireless outbound/inbound messages may be transmitted/received via the antenna. The antenna may be configured to send and/or receive the outbound/inbound wireless messages to/from the AT 222 over one or more channels. The outbound/inbound messages may comprise voice and/or data-only information (collectively referred to herein as "data"). The receiving module 530 may demodulate the data received. The transmitting module 531 may modulate data to be sent from the femto node 210 via the wireless network interface 510. The processing module 505 may provide data to be transmitted.

The receiving module 530 and the transmitting module 531 may comprise a modem. The modem may be configured to modulate/demodulate the outbound/inbound wired messages going to or coming from the network 240. The receiving module 530 may demodulate data received. The demodulated data may be transmitted to the processing module 505. The transmitting module 531 may modulate data to be sent from the femto node 210 via the wired network interface 530. The processing module 505 and/or the decoding module 520 may provide data to be transmitted.

The storing module 510 may comprise processing module cache, including a multi-level hierarchical cache in which different levels have different capacities and access speeds. The storing module 510 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the femto node 210 need not be separate structural elements. For example, the processing module 505 and the storing module 510 may be embodied in a single chip. The processing module 505 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 210, such as the processing module 505 and the decoding module 520, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 6:
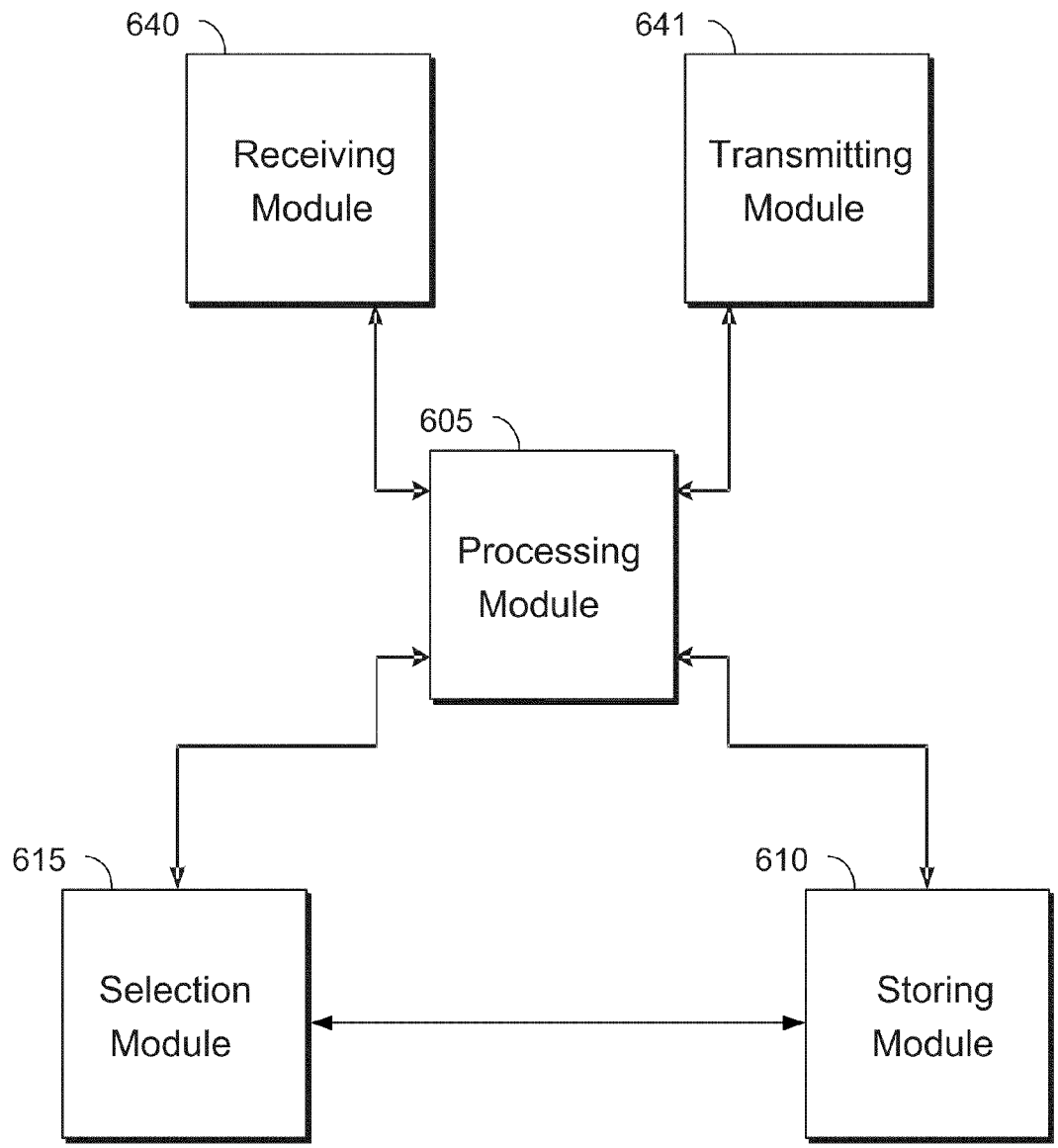
FIG. 6 is a functional block diagram of a second exemplary access terminal in one of the communication networks of FIG. 2.

FIG. 6 is a functional block diagram of a second exemplary access terminal 222 in one of the communication networks of FIG. 2. As discussed above, the AT 222 may be a mobile phone. The AT 222 may be used communicate information to and/or from the femto node 210.

The AT 222 may comprise a processing module 605 configured to process information for storage, transmission, and/or for the control of other components of the AT 222. The processing module 605 may further be coupled to a storing module 610. The processing module 605 may read information from or write information to the storing module 610. The storing module 610 may be configured to store information before, during or after processing. In particular, the storing module 610 may be configured to store the Zadoff-Chu sequences and information associated with the Zadoff-Chu sequences (e.g., a bit pattern associated with each Zadoff-Chu sequence). The processing module 605 may also be coupled to a receiving module 640 and a transmitting module 641. The receiving module 640 may be configured to receive an inbound wireless message from the femto node 210 or the macro node 205. The transmitting module 641 may be configured to transmit an outbound wireless message to the femto node 210 or the macro node 205. The inbound wireless message may be passed to the processing module 605 for processing. The processing module 605 may process the outbound wireless message passing the outbound wireless message to transmitting module 641 for transmission.

The processing module 605 may also be coupled to a selection module 615. The selection module 615 may obtain a Zadoff-Chu sequence to use in a, which may be transmitted from the AT 222 to the femto node 210. For further information, see the written description for FIGS. 9 and 11. For example, the selection module 615 may obtain a bit pattern based on, at least in part, at least one of channel conditions for the wireless link between the AT 222 and the femto node 210, and a buffer status (e.g., how much data the AT 222 may be sending). The selection module 615 may also obtain a bit pattern based on a variety of other factors, including but not limited to, measured channel quality, a reference signal or pilot channel power, a buffer status (e.g., how much of a buffer is in used), priority of the data, whether there is strong interference in the communication channel, a noise level, a signal power level, a data rate, a multi-path, a signal to noise ratio, and an amount of outbound data. The selection module 615 may also be coupled to the storing module 610 to store or retrieve information associated with the Zadoff-Chu sequences which may be used in the preamble.

The receiving module 640 and the transmitting module 641 may comprise an antenna and a transceiver. The transceiver may be configured to modulate/demodulate the outbound/inbound wireless messages going to or coming from femto node 210 and the macro node 205. The outbound/inbound wireless messages may be transmitted/received via the antenna. The antenna may be configured to communicate with the femto node 210 and macro node 205 over one or more channels. The outbound/inbound wireless message may comprise voice and/or data-only information (collectively referred to herein as "data"). The receiving module 640 may demodulate the data received. The receiving module 640 may modulate data to be sent from the AT 222 via the wireless network interface 615. The processing module 605 and/or the selection module 615 may provide data to be transmitted.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the access terminal 222 need not be separate structural elements. For example, the processing module 605 and the storing module 610 may be embodied in a single chip. The processing module 605 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 222, such as the processing module 605 and the selection module 615 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 222 may also be implemented as a combination of computing devices, e.g., a combination of a DSP and a microprocessor, a plurality of microprocessors, one or more microprocessors in conjunction with a DSP communication, or any other such configuration.

FIG. 7 is a table 700 illustrating a first exemplary association of sequences and bit patterns which may be used by the femto nodes and access terminals shown in FIGS. 4, 5, and 6. The table 700 has two columns, a first column labeled "Sequence" and a second column labeled "Bit Pattern." The table 700 also has thirty-two rows. Each row contains a sequence and a bit pattern associated with the sequence. For example, the first row has "ZC0" as the sequence and "00000" as the bit pattern associated with the sequence. The "Sequence" column lists thirty-two sequences, starting from ZC0 through ZC31 and the "Bit Pattern" lists thirty-two bit patterns, starting from "000000" through "111111", respectively. The sequences ZC0 through ZC31 may comprise Zadoff-Chu sequences as discussed above in FIG. 2. In one embodiment, the sequence ZC0 is a root Zadoff-Chu sequence and the sequences ZC1 through ZC 31 may be shifted Zadoff-Chu sequences based on, at least in part, the root Zadoff-Chu sequence ZC0. In another embodiment, all of the sequences ZC0 through ZC31 may be shifted Zadoff-Chu sequences based on, at least in part, a root Zadoff-Chu sequence. In one embodiment, the thirty-two sequences ZC0 through ZC31 may be divided into eight groups, Group 1 through Group 8. Each of the Groups 1 through 8 comprises 4 sequences, such that Group 1 comprises the first four sequences ZC0 through ZC3, and each group after the Group 1 comprises the next four sequences. For example, the Group 1 comprises the sequences ZC0 through ZC3, the Group 2 comprises the sequences ZC4 through ZC7, the Group 3 comprises the sequences ZC8 through ZC11, and so on and so forth. Reference shall be made to elements in FIGS. 2, 5, and 6 in the description of FIG. 7.

As discussed above and shown in FIG. 2, the femto nodes 210 and 212 may support fewer wireless devices (such as ATs 220, 221, and 222) when compared to larger base stations such as such as the macro node 205. For example, the macro node 205 may support up to 64 wireless communication devices, as discussed above but the femto nodes 210 and 212 may each only support four wireless communication devices. In another embodiment, the macro node 205 may support a different number of wireless communication devices, and the femto nodes 210 and 212 may generally support fewer wireless communication devices when compared to the macro node 205.

In one embodiment, the macro node 205 supports thirty-two wireless communication devices (e.g., the macro node 205 may communicate simultaneously with thirty-two different wireless communication devices). Each of the thirty-two wireless communication devices may use one of the sequences ZC0 through ZC31 in a preamble, in order to initiate communications with the macro node 205. The macro node 205 may store (in a memory) or may be able to obtain the list of sequences that wireless communication devices may use in preambles, such as the thirty-two sequences ZC0 through ZC31 shown in the table 700. Generally, two devices may not use the same sequence simultaneously in their respective preambles, as this will cause a collision of their respective preambles, as discussed above. For example, a first device and a second device cannot simultaneously use sequence ZC1 in their respective preambles. However, if the two devices use different sequences (e.g., the first device uses ZC0 and the second device uses ZC2), then the preambles may not collide, due to the orthogonal properties of the sequences, as discussed above. The femto nodes 210 and 212 may each support only four wireless communication devices. The femto nodes 210 and 212 may also store (in a memory) or may be able to obtain the list of sequences that wireless communication devices may use in preambles, such as the thirty-two sequences ZC0 through ZC 31 shown in the table 700. Although the femto nodes 210 and 212 only support four wireless devices each, there may still be thirty-two sequences that the wireless communication devices may use.

In one embodiment, due to the fewer number of wireless communication devices that the femto nodes 210 and 212 may support (e.g., four wireless communication devices), the sequences ZC0 through ZC31 may be divided into eight groups of four sequences each, such as Groups 1 through 8 shown in FIG. 7. Each of the Groups 1 through 8 may provide data indicative of conditions and/or parameters for the system 200 shown in FIG. 2. For example, the sequences ZC0 through ZC3 are designated in the Group 1. The sequence ZC0 is associated with the bit pattern "00000." The sequence ZC1 is associated with the bit pattern "00001." The sequence ZC2 is associated with the bit pattern "00010." The sequence ZC3 is associated with the bit pattern "00011." In one embodiment, the bits of the bit patterns associated with the sequences ZC0 through ZC3 may be used to provide data indicative of conditions and/or parameters for the system 200. In one embodiment, bit positions may be defined as follows: going from left to right in an exemplary bit pattern "01010," the "0" is the first bit position, the "1" is the second bit position, the "0" is the third bit position, the "1" is the fourth bit position, and the "0" is the fifth bit position.

As shown in FIG. 7, the first three bits for each of the bit patterns associated with the sequences ZC0 through ZC3 start with the bit sequence "000." In one embodiment, the first three bit positions may provide data indicative of conditions and parameters for the system 200. The first bit position may provide data indicative of an amount of data the AT 222 may send. For example, if the first bit position is "0", this may indicate that the AT 222 has less data to send to the femto node 215. In another example, if the first bit position is "1", this may indicate that the AT 222 has more data to send to the femto node 215. The second bit position may provide data indicative of a noise level of the wireless link between the AT 222 and the femto node 215. For example, if the second bit position is "0", this may indicate that there is a lower amount of noise in the wireless link. In another example, if the second bit position is "1", this may indicate that there is a higher amount of noise in the wireless link. The third bit position may provide data indicative of a signal power level of the wireless link between the AT 222 and the femto node 215. For example, if the third bit position is "0", this may indicate that there is a lower amount of signal power in the wireless link. In another example, if the third bit position is "1", this may indicate that there is a higher amount of signal power in the wireless link.

Thus, for the exemplary bit pattern "01010" discussed above, the first three bits are "010." This may indicate to the femto node 210 that the AT 222 has less data to send to the femto node 210, that there is a high amount of noise in the wireless link between the femto node 210 and the AT 222, and that there is low signal power between in the wireless link between the femto node 210 and the AT 222. For another exemplary bit pattern "10110," the first three bits are "101." This may indicate that the AT 222 has more data to send to the femto node, that there is a low amount of noise in the wireless link between the femto node 210 and the AT 222, and that there is high signal power between in the wireless link between the femto node 210 and the AT 222.

In another embodiment, rather then using one bit position per parameter or condition, multiple bit positions may be used to represent one parameter or condition in the system 200. For example, in the exemplary bit pattern "01010," the first three bits are "010." The first bit position may provide data indicative of an amount of data the AT 222 may send. For example, if the first bit position is "0," this may indicate that the AT 222 has less data to send to the femto node 215. In another example, if the first bit position is "1," this may indicate that the AT 222 has more data to send to the femto node 215. The second bit and third positions may provide data indicative of a noise level of the wireless link between the AT 222 and the femto node 215. For example, if the second and third bits are "00," this may indicate that there is a low level of noise in the wireless link between the femto node 210 and the AT 222. If the second and third bits are "01," this may indicate that there is a medium level of noise in the wireless link. If the second and third bits are "10," this may indicate that there is a high level of noise in the wireless link. If the second and third bits are "11," this may indicate that there is a very high level of noise in the wireless link. In another embodiment, any number of bits may be used to provide data indicative of a single condition or parameter for the system 200. The more bits used to provide data indicative of the single condition or parameter, the more granularity (e.g., levels of information) may be provided.

In one embodiment, each of the bit patterns associated with the sequences ZC0 through ZC31 may provide data indicative of any combination of conditions and/or parameters for the system 200. For example, the bit patterns may provide data indicative of only the noise level and signal power levels of the system 200. In another example, the bit patterns may provide indicative of only the noise level. In a further example, the bit patterns may provide data indicative of only the signal power levels of the system 200. In one embodiment, the bit patterns may provide data indicative of any combination of conditions and/or parameter including, but not limited to, measured channel quality, a reference signal or pilot channel power, a buffer status (e.g., how much of a buffer is in used), priority of the data, whether there is strong interference in the communication channel, a noise level, a signal power level, a data rate, a multi-path, a signal to noise ratio, and an amount of outbound data.

In one embodiment, the AT 222 may measure and/or obtain the conditions and/or parameters for the system 200. For example, the AT 222 may determine how much data it will send to the femto node 210, how much noise is on the wireless link, and how much signal power is on the wireless link. The AT 222 may then use the conditions and/or parameters to construct a bit sequence providing data indicative of the conditions and/or parameters. For example, as discussed above, the AT 222 may have less data to send, and there may be a high level of noise and a low level of signal power on the wireless link. Once the AT 222 obtains this information, it may construct the bit sequence "000" to indicate the aforementioned conditions and/or parameters. In one embodiment, the information represented by the table 700 may be stored in the storing module 610 on the AT 222. The AT 222 may use the bit sequence "000" when accessing the table 700 stored in the storing module 610, to determine which group of sequences to use in preamble. For example, the first three bits of all the bit patterns in Group 1 start with "000." Thus, the AT 222 may select one of the sequences ZC0 through ZC3 from Group 1 to use in the preamble. In another example, if the first three bits of the bit sequence may be "100." Thus the AT 222 may select one of the sequences ZC16 through ZC19 in Group 5 to use in the preamble.

As shown in FIG. 7, each of the Groups 1 through 8 comprises four sequences and each of the sequences associated is associated with a bit pattern. Each of the sequences within a group (e.g., Group 1) may provide data indicative of the same parameters and/or conditions for the system 200. For example, as discussed above, the first three bits for each of the bit patterns associated with the sequences ZC0 through ZC3 start with the bit sequence "000." Also as discussed above, the first bit position may provide data indicative of the amount of data the AT 222 has to send, the second bit position may provide data indicative of a noise level of the wireless link between the AT 222 and the femto node 210, and the third bit position may provide data indicative of a signal power level of the wireless link. The AT 222 may select any one of the sequences ZC0 through ZC3 to convey the aforementioned conditions and/or parameters to the femto node 210. Because the starting bit sequence for each bit pattern in the Group 1 is "000", and the bit sequence "000" provides information as discussed above, all of the sequences ZC0 through ZC3 may be used to provide data indicative of the same parameters and/or conditions for the system 200.

In another embodiment, the information illustrated by the table 700 may be stored in the storing module 510 on the femto node 210. When the femto node 210 receives a preamble from the AT 222, it may determine which of the sequences ZC0 through ZC31 is used in the preamble, by accessing the table 700 stored in the storing module 510. Once the femto node 210 determines which of the sequences ZC0 through ZC31 is used in the preamble, it may obtain the bit pattern associated with the sequence. For example, AT 222 may transmit a preamble to the femto node 210 using sequence ZC17. When the femto node 210 receives a preamble using sequence ZC17, it may obtain the bit pattern "10001" which is associated with the sequence ZC17. The first three bits of the bit pattern "10001" are "100." Thus, the femto node 210 may analyze the first three bits "100" to determine the conditions and/or parameters for the system 200 that the AT 222 is experiencing. For example, from the bit sequence "100", the femto node 210 may determine that the AT 222 has a high amount of data to send (as indicated by the first bit of "1"), has a low noise level in the wireless link (as indicated by the second bit of "0"), and has a low level of signal power in the wireless link (as indicated by the third bit of "0").

Although the table 700 illustrates eight groups (e.g., Groups 1 through 8), in other embodiments, the sequences ZC0 through ZC31 may be divided into any number of groups. In one embodiment, the sequences ZC0 through ZC31 may be divided into 4 groups of eight sequences each. For example, the first group may comprise sequences ZC0 through ZC7, the second group may comprise sequences ZC8 through ZC15 and so on and so forth. In another embodiment, the sequences ZC0 through ZC31 may be divided into 16 groups of two sequences each. For example, the first group may comprise sequences ZC0 through ZC1, the second group may comprise sequences ZC2 through ZC3 and so on and so forth. In one embodiment, dividing the sequences ZC0 through ZC31 into a larger number of groups may allow the bit patterns associated with each sequence to provide more data indicative of conditions and/or parameters for the system 200. For example, the sequences ZC0 through ZC31 may be divided into only 4 groups, with the first group comprising sequences ZC0 through ZC7. As shown in the table 700, the bit patterns associated with the sequences ZC0 through ZC7 all start with the same bit sequence "00." Because only the first two bits of the patterns associated with the sequences ZC0 through ZC27 are the same, only two bits of the bit pattern may be used to provide data indicative of conditions and/or parameters for the system 200. In another example, the sequences ZC0 through ZC31 may be divided into only 16 groups, with the first group comprising sequences ZC0 through ZC1. As shown in the table 700, the bit patterns associated with the sequences ZC0 through ZC1 all start with the same bit sequence "0000." Because the first four bits of the patterns associated with the sequences ZC0 through ZC27 are the same, four bits of the bit pattern may be used to provide data indicative of conditions and/or parameters for the system 200.

FIG. 8 is a table 800 illustrating a second exemplary association of sequences and bit patterns which may be used by the femto nodes and access terminals shown in FIGS. 4, 5, and 6. The table 800 has two columns, a first column labeled "Sequence" and a second column labeled "Femto Cell ID." The table 800 also has thirty-two rows. Each row contains a sequence and a femto cell ID associated with the sequence. For example, the first row has "ZC0" as the sequence and "0" as the femto cell ID associated with the sequence. The "Sequence" column lists thirty-two sequences, starting from ZC0 through ZC31. A femto cell ID may comprise a pseudo noise (PN) offset. The PN offset may be an identifier broadcasted by the femto node 210 such that ATs such as the AT 222 can identify the femto node 210. Every four sequences are associated with the same femto cell ID. For example, the sequences ZC0 through ZC3 are associated with femto cell ID "0," the sequences ZC4 through ZC7 are associated with the femto cell ID "1," and so on and so forth. In one embodiment, the sequence ZC0 is a root Zadoff-Chu sequence and the sequences ZC1 through ZC 31 are shifted Zadoff-Chu sequences based on, at least in part, the root Zadoff-Chu sequence ZC0. In another embodiment, all of the sequences ZC0 through ZC31 are shifted Zadoff-Chu sequences based on, at least in part, a root Zadoff-Chu sequence. Reference shall be made to elements in FIGS. 2, 5, and 6 in the description of FIG. 8.

In one embodiment, the information illustrated by the table 800 may be stored in the storing module 610 of the femto node 210 and the storing module 710 of the AT 222. The AT 222 may obtain the femto cell ID (e.g., PN offset) of the femto node 210, and it may use the femto cell ID to select a sequence to use in a preamble when the AT 222 initiates a wireless link. For example, the AT 222 may determine that the femto node 210 is broadcasting femto cell ID "2." The AT 222 may then access the information illustrated by the table 800 which may be stored in the storing module 610. Using the information illustrated by the table 800, the AT 222 may select any one of the sequences ZC8 through ZC11 to use in a preamble, because the sequences ZC8 through ZC11 are associated with the femto cell ID "2." After selecting one of the sequences ZC8 through ZC11 to use in a preamble (e.g., ZC10), the AT 222 may transmit a preamble to the femto node 210 using the selected sequence (e.g., ZC10).

In another embodiment, the information illustrated by the table 800 may be stored in the storing module 610 of the femto node 210. The femto node 210 may broadcast the information illustrated by the table 800 to ATs such as the AT 222. In one embodiment, a system information block (SIB) may be used to broadcast this information to ATs such as the AT 222. In general, system information blocks may be used by nodes such as femto nodes and macro nodes to transmit and/or broadcast information to ATs. The AT 222 may receive the system information block and may also receive the femto cell ID of femto node 210. Using the femto cell ID of the femto node 210 and the information about the table 800 in the system information block, the AT 222 may select a sequence to use in a preamble, as discussed above. In one embodiment, the femto node 210 may be able to establish a wireless link with the AT 222 more quickly and/or more efficiently. For example, the femto node 210 may use only the sequences associated with the femto cell ID of the femto node 210 (e.g., sequences ZC8 through ZC11 if the femto node 210 has a femto cell ID of "2"). When the femto node 210 gets a preamble from the AT 222, it may only analyze the sequences ZC8 through ZC11, when it receives the preamble from the AT 222. Since the femto node 210 does not have to analyze all of the sequences ZC0 through ZC31 to obtain the sequence used in the preamble, the femto node 210 may be able to establish a wireless link with the AT 222 more quickly and/or more efficiently than may be required with a greater number of sequences.

Although only femto cell IDs 0 through 7 are shown in the table, other embodiments may allow any number of femto cell IDs to be associated with the bit sequences ZC0 through ZC31. In one embodiment, the femto cell IDs 0 though 15 may be used, such that every two sequences is associated with the same femto cell ID. For example, the sequences ZC0 through ZC1 would be associated with the femto cell ID "0," the sequences ZC2 through ZC3 would be associated with the femto cell ID "1," and so on and so forth. In another embodiment, the femto cell IDs 0 though 3 may be used, such that every eight sequences is associated with the same femto cell ID. For example, the sequences ZC0 through ZC7 would be associated with the femto cell ID "0," the sequences ZC8 through ZC15 would be associated with the femto cell ID "1," and so on and so forth.

Although the above-example discusses femto nodes and femto cell IDs (e.g., PN offset), embodiments of the invention may be applicable to any type of node (e.g., macro nodes, Node Bs, etc.) and other types of identifiers (e.g., primary scrambling codes, physical cell identifier, etc.). In addition, other methods of broadcasting information to ATs such as AT 222 may be used. For example, a GSM may use system information messages instead of system information blocks.

Figure 9:
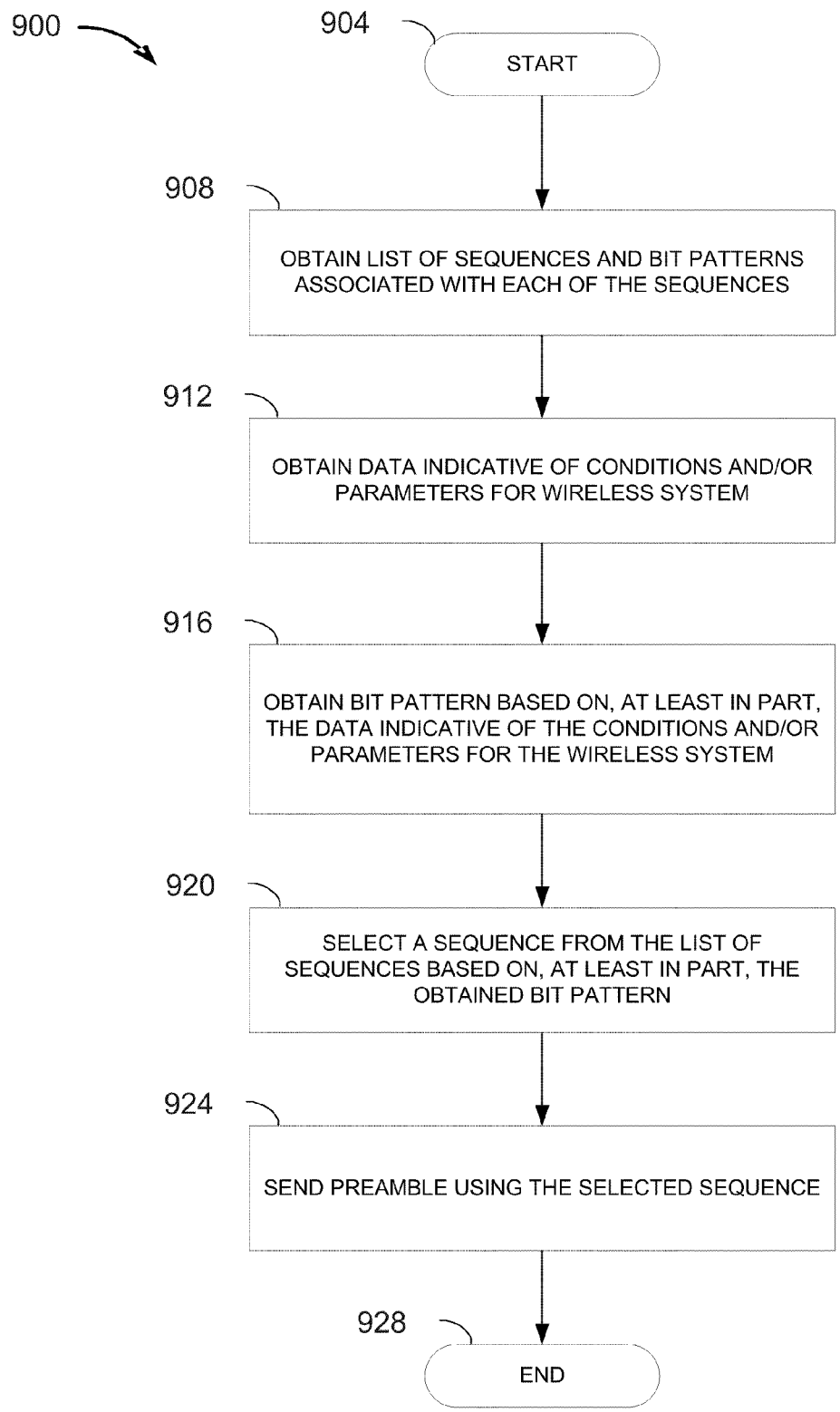
FIG. 9 is a flow chart illustrating a first exemplary communication process which may be performed by the access terminal shown in FIG. 6.

FIG. 9 is a flow chart illustrating a first exemplary communication process 900 which may be performed by the access terminal 222 shown in FIG. 6. The process 900 may be performed by the AT 222 when the AT 222 transmits a preamble to the femto node 210. The process 900 begins at start bock 904 and ends at end block 928. Reference may be made to FIGS. 2, 5, and 6 in the description of FIG. 9. In one embodiment, parts of the process 900 may be performed by the selection module 615 of the AT 222 shown in FIG. 6. In another embodiment, the processing module 605 of the AT 222 may also be used to perform parts of the process 900. The process 900 may be performed only once, or it may be performed periodically. For example, the process 900 may be performed only once when the AT 222 transmits a preamble. In another example, the AT 222 may transmit multiple preambles and the process 900 may be performed each time the AT 222 transmits a preamble.

The process 900 starts at start block 904 and moves to block 908. At block 908, the AT 222 may obtain a list of sequences and the bit patterns associated with each of the sequences. For example, the AT 222 may obtain the information illustrated in the table 700 shown in FIG. 7. In one embodiment, the information illustrated in the table 700 may be stored in the storing module 610 of the AT 222. In another embodiment, the information illustrated in the table 700 may be received from the femto node 210 via the receiving module 640 in the AT 222. After obtaining the list of sequences and the bit patterns associated with each of the sequences, the process moves to block 912, where the AT 222 may obtain data indicative of conditions and/or parameters for the system 200 shown in FIG. 2. For example, the AT 222 may measure a noise level in the wireless link between the AT 222 and the femto node 210. In another example, the AT 222 may measure a signal power level in the wireless link between the AT 222 and the femto node 210. In yet another example, the AT 222 may determine how much data may be sent to the femto node 210. In a further example, the AT 222 may determine whether there is a multipath in the wireless link between the AT 222 and the femto node 210. The processing module 605 may be used to process and/or calculate the data indicative of conditions and/or parameters for the system 200. The storing module 610 may be used to store the data indicative of conditions and/or parameters for the system 200. The receiving module 640 and the transmitting module 641 may be used to obtain the data indicative of conditions and/or parameters for the system 200.

After obtaining data indicative of conditions and/or parameters for the system 200, the process 900 moves to block 916. In block 916, the AT 222 may obtain a bit pattern based on, at least in part, the data indicative of conditions and/or parameters obtained in block 912 by the AT 222. In one embodiment, a plurality of bits in the bit pattern are used to represent the data indicative of conditions and/or parameters obtained in block 912 by the AT 222. In other embodiments, any number of bits in the bit pattern may be used to represent the data indicative of conditions and/or parameters obtained in block 921 by the AT 222. For further information on obtaining the bit pattern, see the written description for FIG. 7. After obtaining a bit pattern based on, at least in part, the data indicative of conditions and/or parameters of the system 200, the process moves to block 920, where the AT 222 selects a sequence to use in a preamble based on, at least in part, the bit pattern obtained in block 916. The AT 222 may use a table, such as the table 700 shown in FIG. 7, when selecting a sequence to use in the preamble. For further information on selecting the preamble, please see the written description for FIG. 7. After selecting one of the sequences, the AT 222 may then construct the preamble. The processing module 605 may be used by the AT 222 when the AT 222 constructs the preamble. The process 900 then moves to block 924, where the AT 222 sends a preamble using the sequence selected in block 920. After sending the preamble, the process 900 moves to the end block 928 where the process 900 ends.

Figure 10:
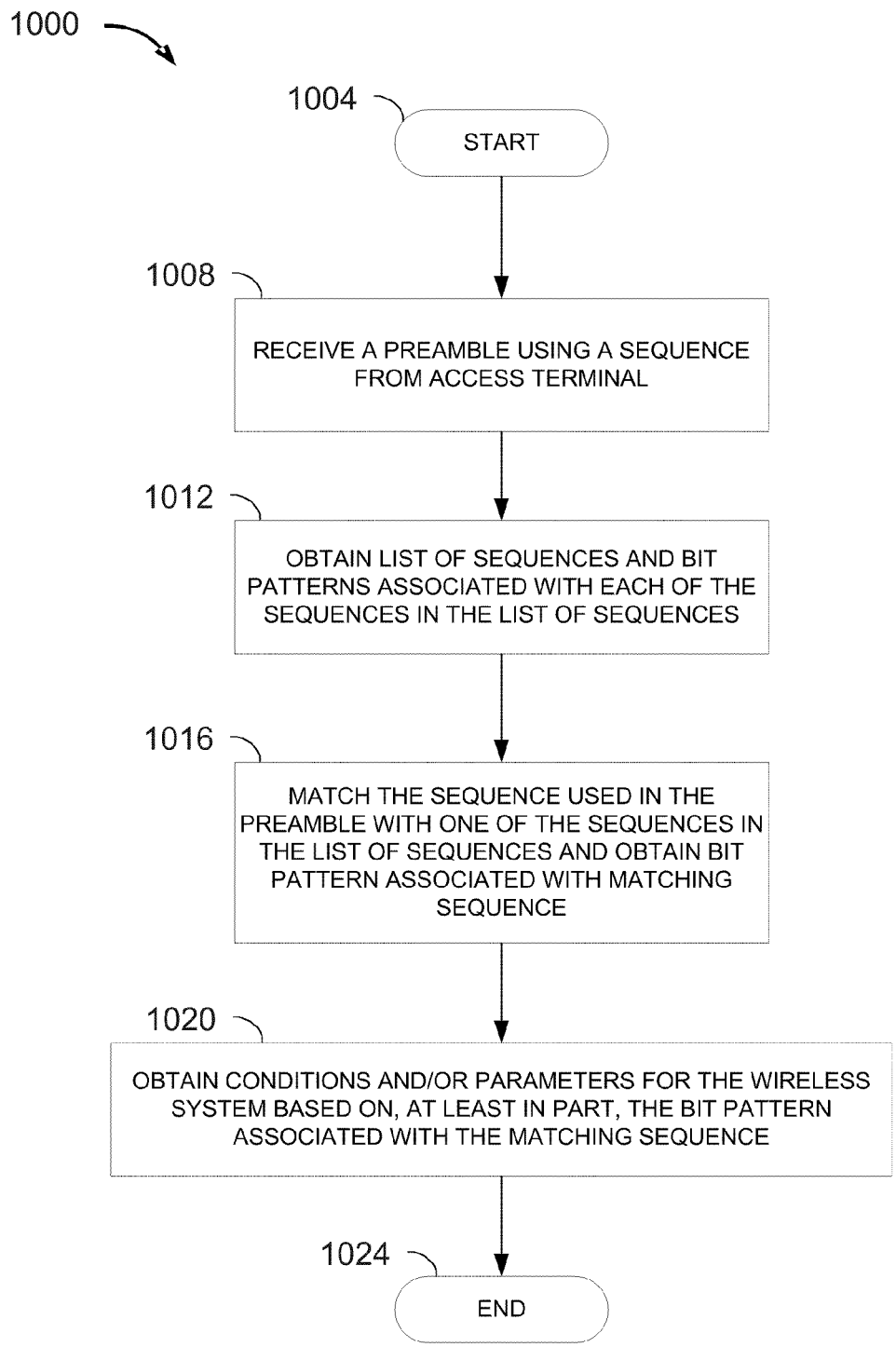
FIG. 10 is a flow chart illustrating a second exemplary communication process which may be performed by the femto node shown in FIG. 5.

FIG. 10 is a flow chart illustrating a second exemplary communication process 1000 which may be performed by the femto node 210 shown in FIG. 5. The process 1000 may be performed by the femto node 210 when the femto node 210 receives a preamble from the AT 222. The AT 222 may send the preamble according to the process 900 described in FIG. 9. The process 1000 begins at start bock 1004 and ends at end block 1024. Reference may be made to FIGS. 2, 5, and 6 in the description of FIG. 10. In one embodiment, parts of the process 1000 may be performed by the decoding module 520 of the femto node 210 shown in FIG. 5. In another embodiment, the processing module 505 of the femto node 210 may also be used to perform parts of the process 1000. The process 1000 may be performed only once, or it may be performed periodically. For example, the process 1000 may be performed only once when the femto node 210 receives a preamble. In another example, the femto node 210 may receive multiple preambles and the process 1000 may be performed each time the femto node 210 receives a preamble.

The process 1000 starts at start block 1004 and moves to block 1008 where the femto node 210 receives a preamble from the AT 222. The preamble received by the femto node 210 from the AT 222 may use a sequence, such as the Zadoff-Chu sequences discussed above in connections with FIG. 2. For further information regarding how the AT 222 selects a sequence to use in the preamble, see the written description for FIGS. 7 and 9. The femto node 210 may use the receiving module 530 to receive the preamble from the AT 222. The femto node 210 may process the preamble using the processing module 505 and it may store the at least a portion of the preamble and/or information associated with the preamble in the storing module 610. After the femto node 210 receives the preamble in block 1008, the process moves to block 1012 where the femto node 210 obtains a list of sequences and bit patterns associated with each of the sequences in the list of sequences. The femto node 210 may use a table containing the list of sequences and bit patterns associated with each of the sequences, such as the table 700 shown in FIG. 7. In one embodiment, the list of sequences and bit patterns associated with each of the sequences (e.g., the table 700 shown in FIG. 7) may be stored in the storing module 610 of the femto node 210. In another embodiment, the list of sequences and bit patterns associated with each of the sequences (e.g., the table 700 shown in FIG. 7) may be stored in another location, e.g., on a computing device (not shown in FIG. 2) in communication with the network 240.

After obtaining the list of sequences and bit patterns associated with each of the sequences, the process 1000 moves to block 1016, where the femto node 210 may match the sequence used in the preamble from the AT 222 with one of the sequences in the list of sequences obtained in block 1012. Additionally, the femto node 210 may obtain the bit pattern associated with the matching sequence in the list of sequences and bit patterns associated with each of the sequences. For further information on how the femto node 210 may obtain the matching sequence and the bit pattern associated with the matching sequence, see the written description for FIG. 7. After matching the sequence received in the preamble from the AT 222 and obtaining the bit pattern associated with the matching sequence, the process moves to block 1020, where the femto node 210 may obtain conditions and/or parameters for the system 200 based on, at least in part, the bit pattern associated with the matching sequence. For further information on how the femto node 210 may obtain conditions and/or parameters for the system 200 based on, at least in part, the bit pattern associated with the matching sequence, see the written description for FIG. 7. After the femto node 210 obtains conditions and/or parameters for the system 200 based on, at least in part, the bit pattern associated with the matching sequence, the process 1000 moves to end block 1024 where the process 1000 ends.

Figure 11:
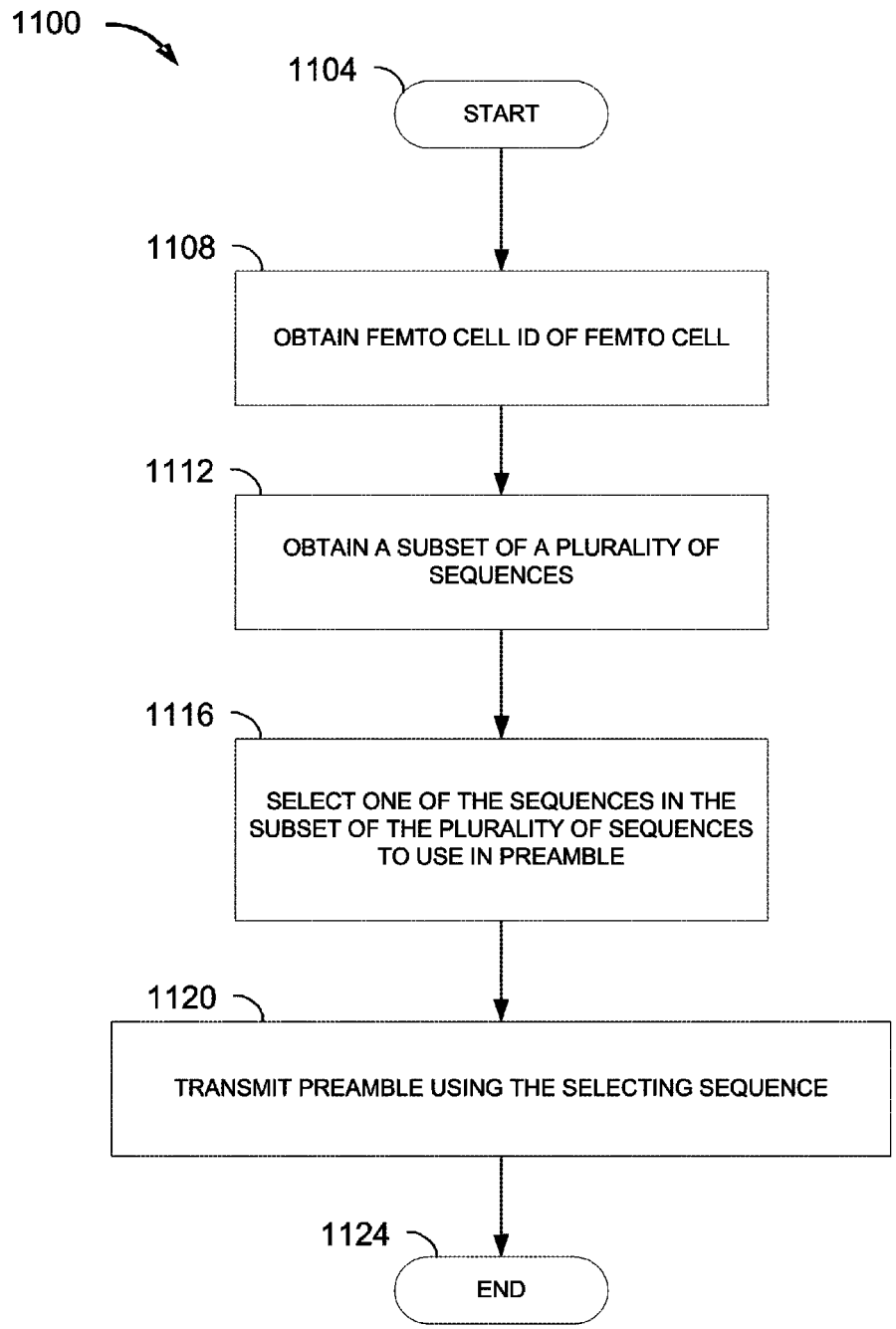
FIG. 11 is a flow chart illustrating a third exemplary communication process which may be performed by the access terminal shown in FIG. 6.

FIG. 11 is a flow chart illustrating a third exemplary communication process 1100 which may be performed by the access terminal 222 shown in FIG. 6. The process 1100 may be performed by the AT 222 when the AT 222 transmits a preamble to the femto node 210. The process 1100 begins at start bock 1104 and ends at end block 1124. Reference may be made to FIGS. 2, 5, and 6 in the description of FIG. 11. In one embodiment, parts of the process 1100 may be performed by the selection module 615 of the AT 222 shown in FIG. 6. In another embodiment, the processing module 605 of the AT 222 may also be used to perform parts of the process 1100.

The process 1100 may be performed only once, or it may be performed periodically. For example, the process 1100 may be performed only once when the AT 222 transmits a preamble. In another example, the AT 222 may transmit multiple preambles and the process 1100 may be performed each time the AT 222 transmits a preamble.

The process 1100 starts at block 1104 and moves to block 1108, where the AT 222 may obtain the femto cell ID of the femto cell 210. As discussed above, the femto cell ID may comprise a PN offset. Also as discussed above, in other embodiments, the AT 222 may obtain the identification of other types of base stations such as NodeBs. The AT 222 may use the receiving module 630 when obtaining the femto cell ID of the femto cell 210. After obtaining the femto cell ID, the process 1100 moves to block 1112, where the AT 222 may obtain a subset of a plurality of sequences which may be used in a preamble. In one embodiment, the plurality of sequences may be stored in a table (such as the table 800 shown in FIG. 8) in the storing module 610 of the AT 222. The AT 222 may obtain the subset of the plurality of sequences by selecting all of the sequences in the plurality of sequences that are associated with the femto cell ID of the femto node 210 obtained in block 1108. In another embodiment, the AT 222 may obtain the subset of the plurality of sequences via SIB messages broadcasted by the femto node 210. In one embodiment, the selection module 615 of the AT 222 may be used to obtain the subset of the plurality of sequences. In another embodiment, the processing module 605 may also be used to obtain the subset of the plurality of sequences. For a further description of how the AT 222 may obtain the subset of the plurality of sequences, see the written description for FIG. 8.

After obtaining the subset of the plurality of sequences, the process 1100 moves to block 1116, where the AT 222 selects one of the sequences in the subset of the plurality of sequences to use in preamble. In one embodiment, the AT 222 may use the selection module 615 when selecting one of the sequences in the subset of sequences to use in the preamble. In another embodiment, the AT 222 may also use the processing module 605 when selecting one of the sequences in the subset of sequences to use in the preamble. After selecting one of the sequences, the AT 222 may then construct the preamble. The processing module 605 may be used by the AT 222 when the AT 222 constructs the preamble. After constructing the preamble, the process 1100 then moves to block 1120 where the AT 222 transmits the preamble to the femto node 210. The AT 222 may use the transmitting module 641 when transmitting the preamble to the femto node 210 using the selected sequence. After the AT 222 transmits the preamble to the femto node 210, the process 100 moves to the end block 1124 where the process 1100 ends.

Figure 12:
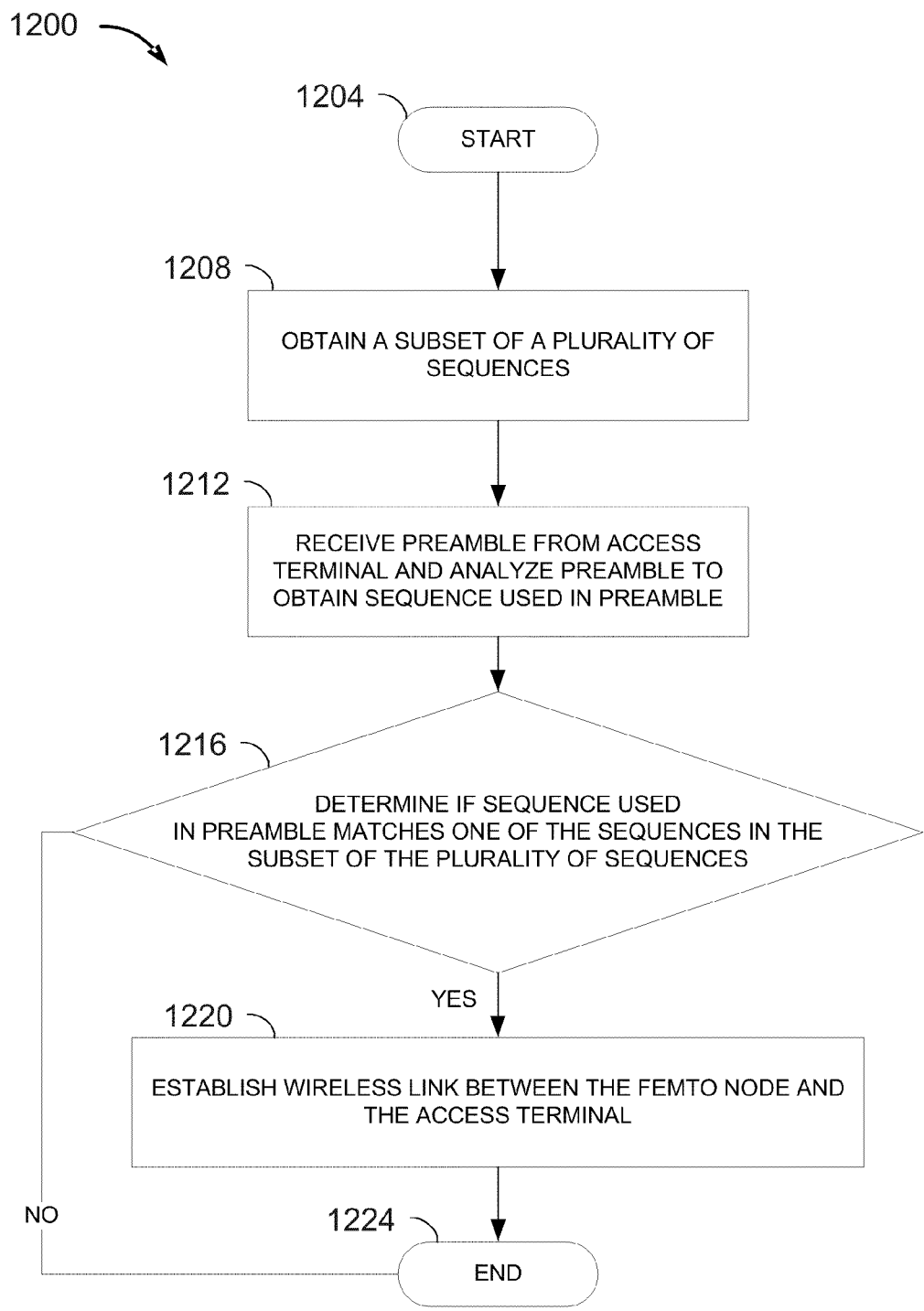
FIG. 12 is a flow chart illustrating a fourth exemplary communication process which may be performed by the femto node shown in FIG. 5.

FIG. 12 is a flow chart illustrating a fourth exemplary communication process 1200 which may be performed by the femto node 210 shown in FIG. 5. The process 1200 may be performed by the femto node 210 when the femto node 210 receives a preamble from the AT 222. The AT 222 may send the preamble according to the process 1100 described in FIG. 11. The process 1100 begins at start bock 1204 and ends at end block 1224. Reference may be made to FIGS. 2, 5, and 6 in the description of FIG. 12. In one embodiment, parts of the process 1200 may be performed by the decoding module 520 of the femto node 210 shown in FIG. 6. In another embodiment, the processing module 505 of the femto node 210 may also be used to perform parts of the process 1200. The femto node 210 may have a femto cell ID (e.g., a PN offset). The process 1200 may be performed only once, or it may be performed periodically. For example, the process 1200 may be performed only once when the femto node 210 receives a preamble. In another example, the femto node 210 may receive multiple preambles and the process 1200 may be performed each time the femto node 210 receives a preamble.

The process 1200 begins at start block 1204 and moves to block 1208, where the femto node 210 may obtain a subset of a plurality of sequences. In one embodiment, the plurality of sequences may be stored in a table (such as the table 800 shown in FIG. 8) in the storing module 510 of the femto node 210. In another embodiment the femto node 210 may only store the sequences listed in the table 800 shown in FIG. 8, which correspond to the femto cell ID of the femto node 210. For example, if the femto node 210 has a femto cell ID of "6," it may only store the sequences ZC20 through ZC 23 in the storing module 510. In a further embodiment, the subset of a plurality of sequences (e.g., sequences ZC 20 through ZC 23 in the table 800 shown in FIG. 8) may be stored in another location, e.g., on a computing device (not shown in FIG. 2) in communication with the network 240. After the femto node 210 obtains the subset of the plurality of sequences, the process 1200 moves to block 1212, where the femto node 210 receives a preamble from the AT 222. The femto node 210 may analyze the preamble and obtain the sequence which is used in the preamble received from the AT 222.

After obtaining the sequence used in the preamble received from the AT 222, the process 1200 moves to block 1216, where the femto node 210 determines if the sequence used in the preamble matches one of the sequences in the subset obtained in the block 1208 of the process 1200. If the sequence used in the preamble does not match one of the sequences in the subset obtained in the block 1208 of the process 1200, the process 1200 moves to end block 1224 where the process 1200 ends. If the sequence used in the preamble does match one of the sequences in the subset obtained in the block 1208 of the process 1200, the process then moves to block 1220, where the femto node 210 may establish a wireless link with the AT 222. After establishing the wireless link, the process 1200 moves to the end block 1224 where the process 1200 ends.

Figure 13:
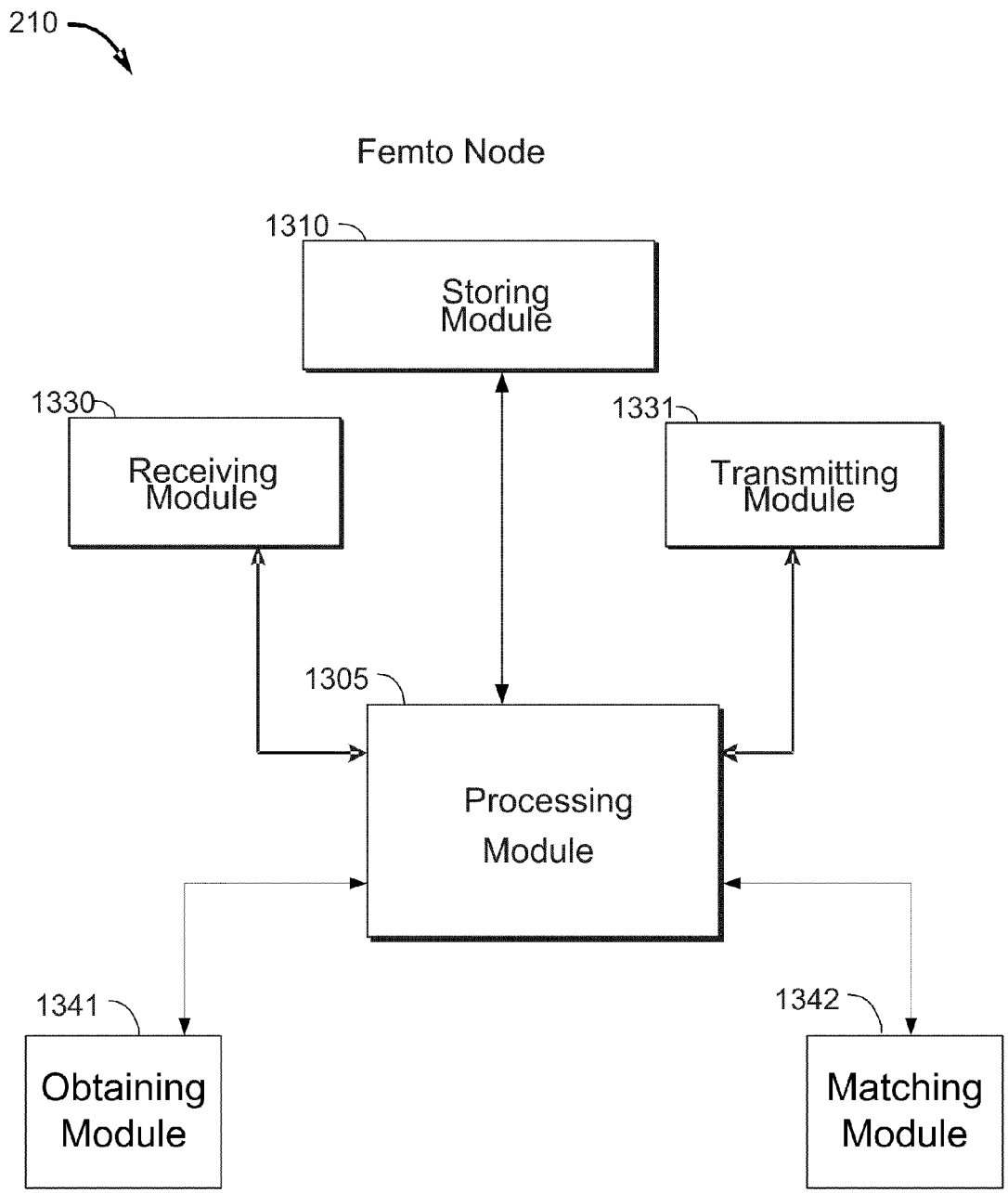
FIG. 13 is a functional block diagram of a third exemplary femto node in one of the communication networks of FIG. 2.

FIG. 13 is a functional block diagram of a third exemplary femto node in one of the communication networks of FIG. 2. As shown, the femto node 210 may comprise a processing module 1305, a storing module 1310, an obtaining module 1341, a matching module 1342, a receiving module 1330, and a transmitting module 1331. The processing module 1305 may correspond at least in some aspects to, for example, a processor as discussed herein. The storing module 1310 may correspond at least in some aspects to, for example, a memory as discussed herein. The receiving module 1330 may correspond at least in some aspects to, for example, a transceiver as discussed herein. The transmitting module 1331 may correspond at least in some aspects to, for example, a transceiver as discussed herein. The obtaining module 1341 may correspond at least in some aspects to, for example, a decoding module as discussed herein. The matching module 1342 may correspond at least in some aspects to, for example, a decoding module as discussed herein.

Figure 14:
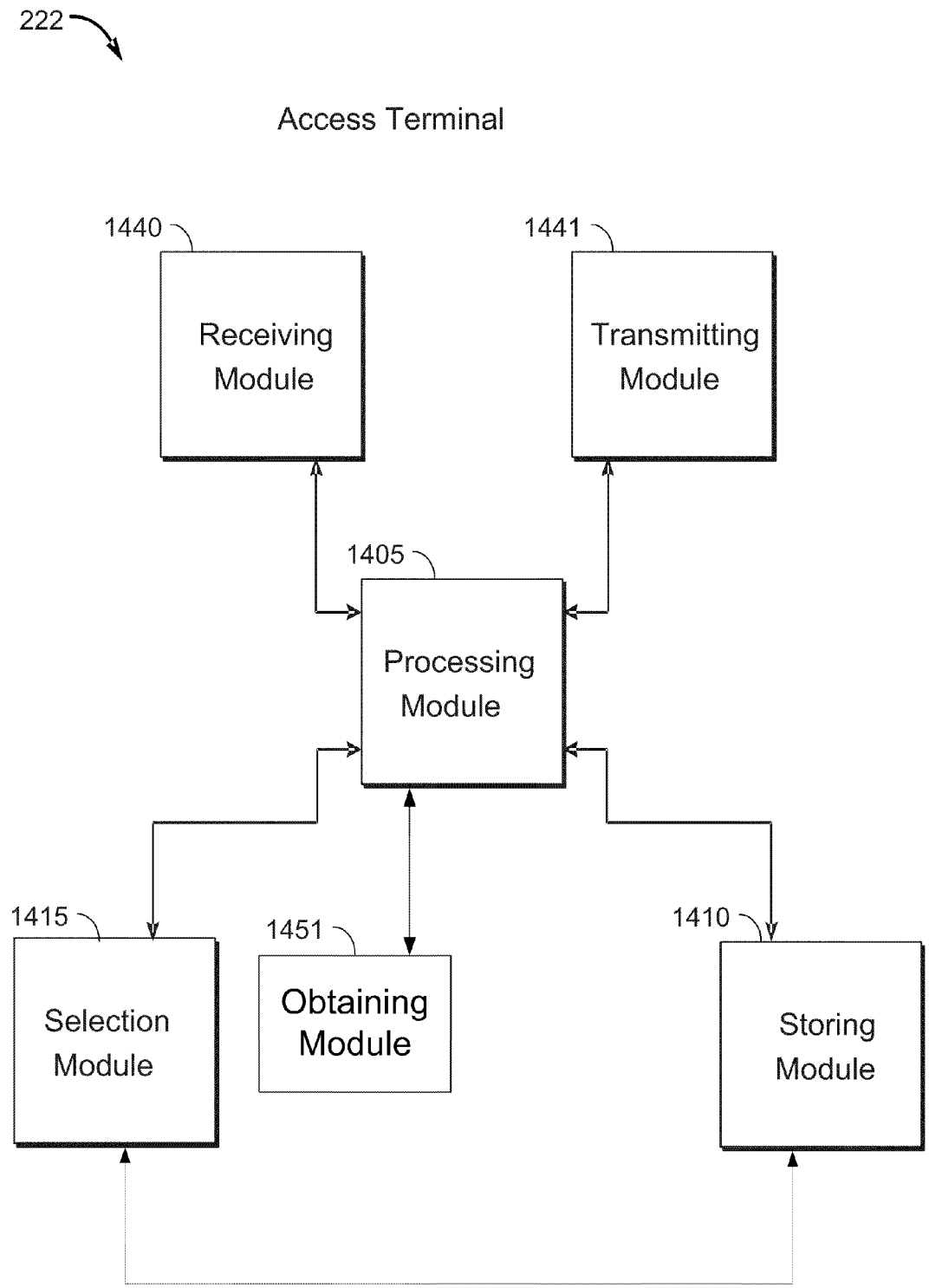
FIG. 14 is a functional block diagram of a third exemplary access terminal in one of the communication networks of FIG. 2.

FIG. 14 is a functional block diagram of a third exemplary access terminal in one of the communication networks of FIG. 2. As shown, the AT 220 may comprise a processing module 1405, a storing module 1410, a selection module 1415, a obtaining module 1451, a receiving module 1440, and a transmitting module 1440. The processing module 1405 may correspond at least in some aspects to, for example, a processor as discussed herein. The storing module 1410 may correspond at least in some aspects to, for example, a memory as discussed herein. The receiving module 1340 may correspond at least in some aspects to, for example, a transceiver as discussed herein. The transmitting module 1341 may correspond at least in some aspects to, for example, a transceiver as discussed herein. The selection module 1415 may correspond at least in some aspects to, for example, the selection module 615 of FIG. 2 as discussed herein. The first obtaining module 1451 may correspond at least in some aspects to, for example, the selection module 615 of FIG. 2 as discussed herein.

The functionality of the modules of FIGS. 13-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The functionality described herein (e.g., with regard to one or more of the accompanying figures) may correspond in some aspects to similarly designated "means for" functionality in the appended claims. Referring to FIGS. 5-6 and 13-14, the femto node 210 and the AT 222 are represented as a series of interrelated functional modules.

The functionality of the modules of FIGS. 5-6 and 13-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, a connection may be used to transmit and/or receive computer-readable medium. For example, the software may be transmitted from a website, server, or other remote source using a coaxial cable, fiber optic cable, twisted pair, digital subscriber line (DSL), or wireless technologies such as infrared, radio, and microwave. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication apparatus operable in a communication system, the wireless communication apparatus comprising:
    a receiver configured to receive an identification of a base station, wherein the identification comprises a type of cell, comprising a low transmit power, comprising a femto cell or a pico cell;
    a selection circuit configured to:
        obtain a subset of a plurality of sequences based on, at least in part, the identification of the base station, and
        select a first sequence from the subset of the plurality of sequences; and
    a transmitter configured to transmit a preamble, using the first sequence, wherein a format of the preamble comprises at least one of format 0, format 1, format 2, format 3, or format 4, wherein the format of the preamble is selected based on the type of cell.

2. The apparatus of claim 1, wherein transmitter is further configured to transmit at least one of voice, video, and multimedia data to the base station and the receiver is further configured to receive at least one of voice, video, and multimedia data from the base station.

3. The apparatus of claim 1, wherein each sequence in the subset of the plurality of sequences comprises at least one of a Zadoff-Chu sequence, an orthogonal variable spreading factor code, and a mathematical sequence and/or code which comprises orthogonal properties.

4. The apparatus of claim 1, wherein the preamble comprises at least a cyclic prefix portion and a sequence portion.

5. The apparatus of claim 1, wherein the format of the preamble comprises format 4, and wherein the communication system comprises at least one of a frequency divisional multiple access communication system and a code division multiple access communication system.

6. The apparatus of claim 1, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

7. The apparatus of claim 1, wherein the selection circuit is further configured to obtain the subset of the plurality of sequences via a memory in communication with the selection circuit.

8. The apparatus of claim 1, wherein the selection circuit is further configured to obtain the subset of the plurality of sequences via a message received from a base station.

9. A wireless communication apparatus operable in a communication system, the wireless communication apparatus comprising:
    means for receiving an identification of a base station, wherein the identification comprises a type of cell, comprising a low transmit power, comprising a femto cell or a pico cell;
    means for obtaining a subset of a plurality of sequences based on, at least in part, the identification of the base station;
    means for selecting a first sequence from the subset of the plurality of sequences; and
    means for transmitting a preamble, using the first sequence, wherein a format of the preamble comprises at least one of format 0, format 1, format 2, format 3, or format 4, wherein the format of the preamble is selected based on the type of cell.

10. The apparatus of claim 9, wherein the means for transmitting is further configured to transmit at least one of voice, video, and multimedia data to the base station, wherein the means for receiving receives at least one of voice, video, and multimedia data from the base station.

11. The apparatus of claim 9, wherein each sequence in the subset of the plurality of sequences comprises at least one of a Zadoff-Chu sequence, an orthogonal variable spreading factor code, and a mathematical sequence and/or code which comprises orthogonal properties.

12. The apparatus of claim 9, wherein the preamble comprises at least a cyclic prefix portion and a sequence portion.

13. The apparatus of claim 9, wherein the format of the preamble comprises format 4, and wherein the communication system comprises at least one of a frequency divisional multiple access communication system and a code division multiple access communication system.

14. The apparatus of claim 10, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

15. The apparatus of claim 9, wherein at least one of the parameters of the communication system comprises at least one of a measured channel quality, a reference signal power, a pilot channel power, a buffer status, a data priority, an interference level, a noise level, a signal power level, a data rate, a multi-path, a signal to noise ratio, and an amount of outbound data.

16. The apparatus of claim 9, further comprising means for storing the subset of the plurality of sequences, wherein the storing means is in communication with the obtaining means.

17. The apparatus of claim 9, further comprising means for obtaining the subset of the plurality of sequences via a message received from a base station.

18. A method of communicating in a communication system, the method comprising:
    receiving an identification of a base station, wherein the identification comprises a type of cell, comprising a low transmit power, comprising a femto cell or a pico cell;
    obtaining a subset of a plurality of sequences based on, at least in part, the identification of the base station;
    selecting a first sequence from the subset of the plurality of sequences; and
    transmitting a preamble, using the first sequence, wherein a format of the preamble comprises at least one of format 0, format 1, format 2, format 3, or format 4, wherein the format of the preamble is selected based on the type of cell.

19. The method of claim 18, further comprising transmitting at least one of voice, video, and multimedia data to the base station and receiving at least one of voice, video, and multimedia data from the base station.

20. The method of claim 18, wherein each sequence in the subset of the plurality of sequences comprises at least one of a Zadoff-Chu sequence, an orthogonal variable spreading factor code, and a mathematical sequence and/or code which comprises orthogonal properties.

21. The method of claim 18, wherein the preamble comprises at least a cyclic prefix portion and a sequence portion.

22. The method of claim 18, wherein the format of the preamble comprises format 4, and wherein the communication system comprises at least one of a frequency divisional multiple access communication system and a code division multiple access communication system.

23. The method of claim 18, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

24. The method of claim 18, further comprising obtaining the subset of the plurality of sequences via a memory in communication with the selection circuit.

25. The method of claim 18, further comprising obtaining the subset of the plurality of sequences via a message received from a base station.

26. A non-transitory computer readable medium encoded with computer programs or codes comprising:
    code for causing a computer to receive an identification of a base station, wherein the identification comprises a type of cell, comprising a low transmit power, comprising a femto cell or a pico cell;
    code for causing a computer to obtain a subset of a plurality of sequences based on, at least in part, the identification of the base station;
    code for causing a computer to select a first sequence from the subset of the plurality of sequences; and
    code for causing a computer to transmit a preamble, using the first sequence, wherein a format of the preamble comprises at least one of format 0, format 1, format 2, format 3, or format 4, wherein the format of the preamble is selected based on the type of cell.

27. The computer program product of claim 26, further comprising code for causing a computer to transmit at least one of voice, video, and multimedia data to the base station and receive at least one of voice, video, and multimedia data from the base station.

28. The computer program product of claim 26, wherein each sequence in the subset of the plurality of sequences comprises at least one of a Zadoff-Chu sequence, an orthogonal variable spreading factor code, and a mathematical sequence and/or code which comprises orthogonal properties.

29. The computer program product of claim 26, wherein the preamble comprises at least a cyclic prefix portion and a sequence portion.

30. The computer program product of claim 26, wherein the format of the preamble comprises format 4, and wherein the communication system comprises at least one of a frequency divisional multiple access communication system and a code division multiple access communication system.

31. The computer program product of claim 26, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

32. The computer program product of claim 26, wherein at least one of the parameters of the communication system comprises at least one of a measured channel quality, a reference signal power, a pilot channel power, a buffer status, a data priority, an interference level, a noise level, a signal power level, a data rate, a multi-path, a signal to noise ratio, and an amount of outbound data.

33. The computer program product of claim 26, further comprising code for causing a computer to obtain the subset of the plurality of sequences via a memory in communication with the selection circuit.

34. The computer program product of claim 26, further comprising code for causing a computer to obtain the subset of the plurality of sequences via a message received from a base station.

35. A wireless communication apparatus operable in a communication system, the wireless communication apparatus comprising:
   a memory configured to store a subset of a plurality of sequences each sequence being associated with one of a plurality of bit patterns, wherein the stored subset of a plurality of sequences comprises a type of cell, comprising a low transmit power, comprising a femto cell or a pico cell;
   a receiver configured to receive a preamble from an access terminal, the preamble comprising a preamble sequence; and
   a decoding circuit in communication with the memory, the decoding circuit being configured to:
      obtain the preamble sequence, and
      match the preamble sequence with a matching sequence in the subset of the plurality of sequences, wherein a format of the preamble comprises at least one of format 0, format 1, format 2, format 3, or format 4, wherein the format of the preamble is selected based on the type of cell.

36. The apparatus of claim 35, further comprising a transmitter configured to transmit at least one of voice, video, and multimedia data to the access terminal and wherein the receiver is configured to receive at least one of voice, video, and multimedia data from the access terminal.

37. The apparatus of claim 35, wherein each sequence in the subset of the plurality of sequences comprises at least one of a Zadoff-Chu sequence, an orthogonal variable spreading factor code, and a mathematical sequence and/or code which comprises orthogonal properties.

38. The apparatus of claim 35, wherein the preamble comprises at least a cyclic prefix portion and a sequence portion.

39. The apparatus of claim 35, wherein the format of the preamble comprises format 4, and wherein the communication system comprises at least one of a frequency divisional multiple access communication system and a code division multiple access communication system.

40. The apparatus of claim 35, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

41. A wireless communication apparatus operable in a communication system, the wireless communication apparatus comprising:
   means for storing a subset of a plurality of sequences each sequence being associated with one of a plurality of bit patterns, wherein the stored subset of a plurality of sequences comprises a type of cell, comprising a low transmit power, comprising a femto cell or a pico cell;
   means for receiving a preamble from an access terminal, the preamble comprising a preamble sequence;
   means for obtaining the preamble sequence; and
   means for matching the preamble sequence with a matching sequence in the subset of the plurality of sequences, wherein a format of the preamble comprises at least one of format 0, format 1, format 2, format 3, or format 4, wherein the format of the preamble is selected based on the type of cell.

42. The apparatus of claim 41, further comprising means for transmitting at least one of voice, video, and multimedia data to the access terminal, wherein the means for receiving receives at least one of voice, video, and multimedia data from the access terminal.

43. The apparatus of claim 41, wherein each sequence in the subset of the plurality of sequences comprises at least one of a Zadoff-Chu sequence, an orthogonal variable spreading factor code, and a mathematical sequence and/or code which comprises orthogonal properties.

44. The apparatus of claim 41, wherein the preamble comprises at least a cyclic prefix portion and a sequence portion.

45. The apparatus of claim 41, wherein the format of the preamble comprises format 4, and wherein the communication system comprises at least one of a frequency divisional multiple access communication system and a code division multiple access communication system.

46. The apparatus of claim 41, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

47. A method of communicating in a communication system, the method comprising:
   storing a subset of a plurality of sequences each sequence being associated with one of a plurality of bit patterns, wherein the stored subset of a plurality of sequences comprises a type of cell, comprising a low transmit power, comprising a femto cell or a pico cell;
   receiving a preamble from an access terminal, the preamble comprising a preamble sequence;
   obtaining the preamble sequence; and
   matching the preamble sequence with a matching sequence in the subset of the plurality of sequences, wherein a format of the preamble comprises at least one of format 0, format 1, format 2, format 3, or format 4, wherein the format of the preamble is selected based on the type of cell.

48. The apparatus of claim 47, further comprising transmitting at least one of voice, video, and multimedia data to the access terminal and receiving at least one of voice, video, and multimedia data from the access terminal.

49. The method of claim 47, wherein each sequence in the subset of the plurality of sequences comprises at least one of a Zadoff-Chu sequence, an orthogonal variable spreading factor code, and a mathematical sequence and/or code which comprises orthogonal properties.

50. The method of claim 47, wherein the preamble comprises at least a cyclic prefix portion and a sequence portion.

51. The method of claim 47, wherein the format of the preamble comprises format 4, and wherein the communication system comprises at least one of a frequency divisional multiple access communication system and a code division multiple access communication system.

52. The method of claim 47, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

53. The method of claim 47, wherein at least one of the parameters of the communication system comprises at least one of a measured channel quality, a reference signal power, a pilot channel power, a buffer status, a data priority, an interference level, a noise level, a signal power level, a data rate, a multi-path, a signal to noise ratio, and an amount of outbound data.

54. A non-transitory computer readable medium encoded with computer programs or codes comprising:
  code for causing a computer to store a subset of a plurality of sequences each sequence being associated with one of a plurality of bit patterns, wherein the stored subset of a plurality of sequences comprises a type of cell, comprising a low transmit power, comprising a femto cell or a pico cell;
  code for causing a computer to receive a preamble from an access terminal, the preamble comprising a preamble sequence;
  code for causing a computer obtain the preamble sequence; and
  code for causing a computer match the preamble sequence with a matching sequence in the subset of the plurality of sequences, wherein a format of the preamble comprises at least one of format 0, format 1, format 2, format 3, or format 4, wherein the format of the preamble is selected based on the type of cell.

55. The computer program product of claim 54, further comprising code for causing a computer to transmit at least one of voice, video, and multimedia data to the access terminal and receive at least one of voice, video, and multimedia data from the access terminal.

56. The computer program product of claim 54, wherein each sequence in the subset of the plurality of sequences comprises at least one of a Zadoff-Chu sequence, an orthogonal variable spreading factor code, and a mathematical sequence and/or code which comprises orthogonal properties.

57. The computer program product of claim 54, wherein the preamble comprises at least a cyclic prefix portion and a sequence portion.

58. The computer program product of claim 54, wherein the format of the preamble comprises format 4, and wherein the communication system comprises at least one of a frequency divisional multiple access communication system and a code division multiple access communication system.

59. The computer program product of claim 54, wherein a format of the preamble comprises a modified format 4, wherein a first sequence length of preamble is identical to a second sequence length a second preamble using the format 4, wherein a first time required to transmit the preamble is less than a second time required to transmit the second preamble using the format 4, and wherein less sub-carriers are used to transmit the preamble than to transmit the second preamble using the format 4.

* * * * *